US012798268B2

(12) United States Patent
Arita et al.

(10) Patent No.: US 12,798,268 B2
(45) Date of Patent: Nov. 17, 2026

(54) PRINTING APPARATUS, CONTROL METHOD THEREFOR, AND STORAGE MEDIUM

(71) Applicant: CANON KABUSHIKI KAISHA, Tokyo (JP)

(72) Inventors: Keisuke Arita, Tokyo (JP); Masashi Ito, Tokyo (JP); Motoyuki Taguchi, Tokyo (JP); Kento Tamari, Saitama (JP); Sho Takahashi, Kanagawa (JP); Ryota Komatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 18/627,497

(22) Filed: Apr. 5, 2024

(65) Prior Publication Data

US 2024/0351356 A1 Oct. 24, 2024

(30) Foreign Application Priority Data

Apr. 18, 2023 (JP) ................................. 2023-068019

(51) Int. Cl.
*B41J 13/00* (2006.01)

(52) U.S. Cl.
CPC ....... *B41J 13/0036* (2013.01); *B41J 13/0018* (2013.01)

(58) Field of Classification Search
CPC . B41J 13/0036; B41J 13/0018; B41J 13/0027
See application file for complete search history.

(56) References Cited

U.S. PATENT DOCUMENTS

2018/0272755 A1* 9/2018 Komuro .................. B65H 5/24
2023/0312301 A1 10/2023 Arita et al.

FOREIGN PATENT DOCUMENTS

JP H06-56299 A 3/1994

OTHER PUBLICATIONS

Kento Tamari, U.S. Appl. No. 18/751,485, filed Jun. 24, 2024.

* cited by examiner

*Primary Examiner* — Justin Seo
(74) *Attorney, Agent, or Firm* — VENABLE LLP

(57) ABSTRACT

A printing apparatus includes a printing unit, a first conveying roller upstream side the printing unit, a second conveying roller to convey a print medium from the first conveying roller, and a third conveying roller to convey the print medium to the first conveying roller. A control unit controls the first conveying roller and the third conveying roller to make a leading end portion of a second print medium succeeding a first print medium overlap a trailing end portion of the first print medium. In a case where a region on the second print medium on which printing is performed is a to-be-printed region, the first conveying roller and the second conveying roller separate the first print medium and the second print medium made to overlap each other, and conveyance of the second print medium is suppressed while the printing unit is located in a region other than the to-be-printed region.

11 Claims, 16 Drawing Sheets

| PRINTING ORDER N | PAGE K | Mth SHEET |
|---|---|---|
| 1 | 1 | 1 |
| 2 | 2 | 2 |

PRINTING APPARATUS, CONTROL METHOD THEREFOR, AND STORAGE MEDIUM

BACKGROUND OF THE INVENTION

Field of the Invention

The present invention relates to a printing apparatus.

Description of the Related Art

Some of the printing apparatuses such as inkjet printers are configured to consecutively feed two or more sheet-like media, sequentially perform printing on the media, and convey the media in an overlap state during the printing (Japanese Patent Laid-Open No. 6-56299). Such a conveyance mode is also expressed as successive overlapped conveyance. This conveyance mode can improve the efficiency of printing processing.

In the above printing apparatus, two or more printed media are separated (the overlap state of the media is canceled) and then discharged. This operation is performed by inhibiting the conveyance of a succeeding medium with respect to a preceding medium. Accordingly, this can affect the quality of printing on the succeeding medium.

SUMMARY OF THE INVENTION

The present invention provides a technique advantageous in suppressing or reducing the deterioration in the print quality.

One of the aspects of the present invention provides a printing apparatus, comprising a printing unit configured to perform printing on a print medium, a first conveying unit configured to convey the print medium in a conveying direction, a second conveying unit configured to convey the print medium conveyed by the first conveying unit, and a control unit configured to execute first control to control the first conveying unit and the second conveying unit so as to make a leading end portion of a second print medium succeeding a first print medium overlap a trailing end portion of the first print medium, wherein in a case where a region on the second print medium on which printing is performed by the printing unit is a to-be-printed region, the control unit executes second control to control the first conveying unit and the second conveying unit so as to separate the first print medium and the second print medium made to overlap each other by the first control, and in the second control, conveyance of the second print medium is suppressed while the printing unit is located in a region other than the to-be-printed region.

Further features of the present invention will become apparent from the following description of exemplary embodiments (with reference to the attached drawings).

DESCRIPTION OF THE EMBODIMENTS

Figure 1:
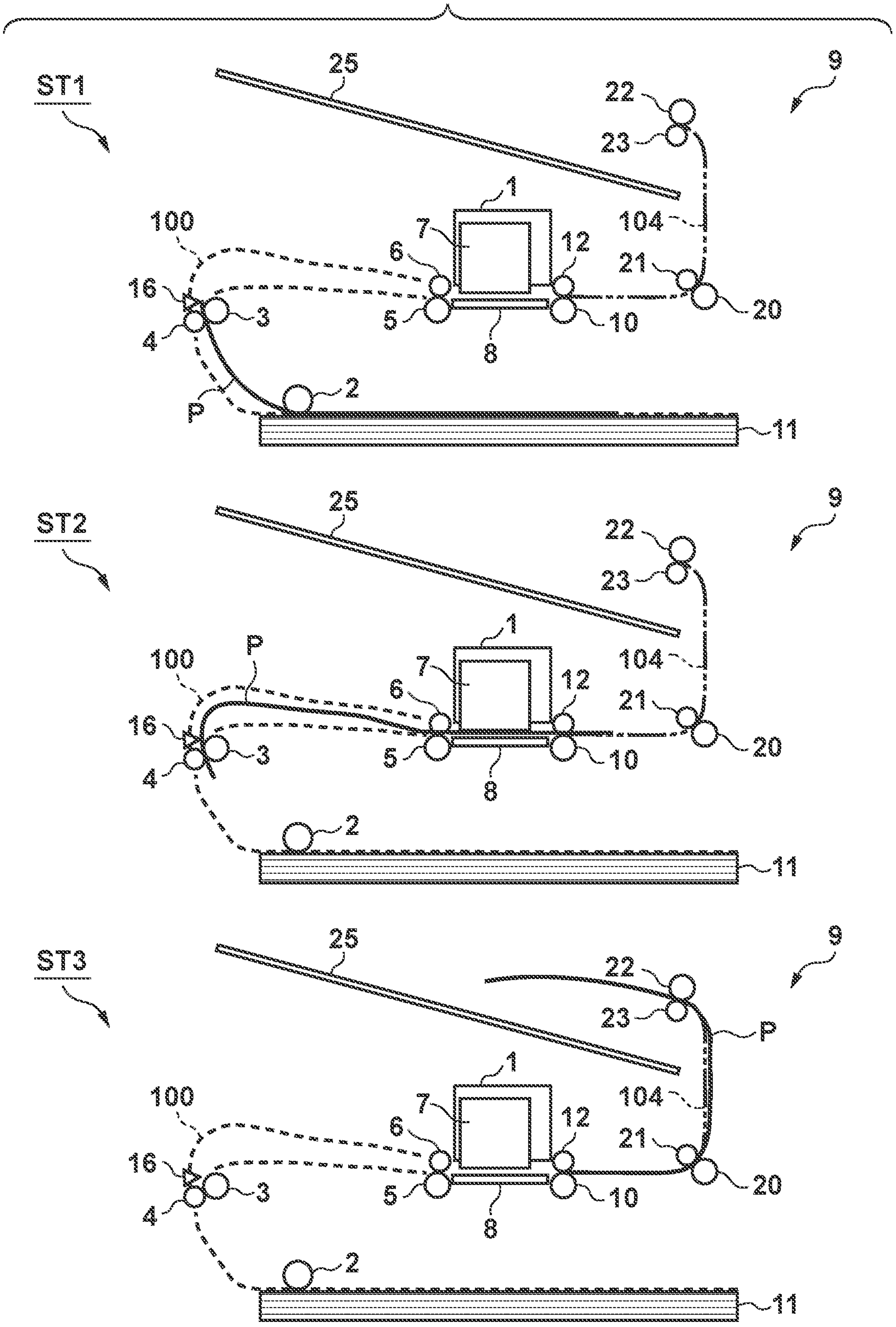
FIG. 1 is a schematic side view showing an example of the arrangement of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Overall Arrangement>

FIG. 1 is a schematic view for explaining an example of the arrangement of a printing apparatus 9 according to an embodiment. FIG. 1 exemplarily shows operation states ST1 to ST3 in the printing apparatus 9. The printing apparatus 9 includes a carriage 1, a printhead 7, a platen 8, a sheet stacking unit 11, a detection sensor 16, a paper discharge unit 25, and rollers 2 to 6, 10, 12, and 20 to 23.

In the state ST1, sheet-like print media P such as cut sheets are stacked on the sheet stacking unit 11. The roller 2 is a pickup roller that picks up the one print medium P by rotating in contact with the uppermost one of the plurality of print media P stacked on the sheet stacking unit 11. The roller 3 is a feed roller that feeds the picked-up print medium P to the downstream side in the conveying direction along the inside of a conveyance path 100. The roller 4 is a driven roller that is biased against the feed roller 3 to feed the print medium P while holding the print medium P together with the feed roller 3.

Note that the conveying direction in this case indicates the conveying direction of the print medium P. The downstream side indicates the side in the same direction as the conveying direction of the print medium P, and the side opposite to the conveying direction is expressed as the upstream side. In addition, an end of the print medium P on the downstream side is expressed as a leading end, and an end of the print medium P on the upstream side is expressed as a trailing end.

A one-way roller is used as the pickup roller 2. When the picked-up print medium P reaches the position of the rollers 3 and 4, and the rollers 3 and 4 start to feed the print medium P, the driving of the pickup roller 2 may be stopped. In this case, the pickup roller 2 idles until the trailing end of the print medium P passes and can be inhibited from picking up the next print medium P.

The roller 5 is a conveyance roller that conveys the print medium P fed by the rollers 3 and 4 to a position facing the printhead 7. The roller 6 is a driven roller that is biased against the conveyance roller 5 to convey the print medium P while holding the print medium P together with the conveyance roller 5.

The rollers 3 and 4 described above form a feed nip portion. The rollers 5 and 6 form a conveyance nip portion. The print medium P is properly guided along a predetermined path in the conveyance path 100 between these nip portions. The detection sensor 16 is provided on the downstream side of the rollers 3 and 4 and can detect the conveyed print medium P (its leading end and trailing end).

In the state ST2, the printhead 7 performs printing on the print medium P conveyed by the rollers 5 and 6. In this embodiment, the printhead 7 is an inkjet head that can execute printing on the print medium P by causing a nozzle 71 (see FIG. 7 and the like) (to be described later) to discharge ink. The platen 8 is arranged to face the printhead 7 and supports the print medium P from the reverse surface of the print medium P (the surface on the opposite side to the printing surface).

The carriage 1 is equipped with the printhead 7 and causes the printhead 7 to scan in a direction crossing the conveying direction (the crossing direction will be referred to as a scanning direction). In such an arrangement, the printhead 7 is also expressed as a serial head, and the printing apparatus 9 can also be expressed as a serial printer.

The roller 10 is a conveyance roller that conveys, toward the roller 20, the print medium P on which printing has been performed by the printhead 7. The roller 12 is a driven roller that is biased against the conveyance roller 10 to convey the printed print medium P while holding the print medium P together with the conveyance roller 10.

In the state ST3, the printed print medium P is discharged to the paper discharge unit 25. The roller 20 is a conveyance roller that conveys the printed print medium P which is conveyed by the rollers 10 and 12. The roller 21 is a driven roller that is biased against the conveyance roller 20 to convey the printed print medium P while holding the print medium P together with the conveyance roller 21.

The roller 22 is a paper discharge roller that is arranged upstream of the paper discharge unit 25 and discharges, to the paper discharge unit 25, the printed print medium P which is conveyed from the conveyance roller 20 to a conveyance path (paper discharge path) 104. The roller 23 is a driven roller that is biased against the paper discharge roller 22 to discharge, to the paper discharge unit 25, the printed print medium P while holding the print medium P together with the paper discharge roller 22.

<Printing Operation>

Figures 2, 3:
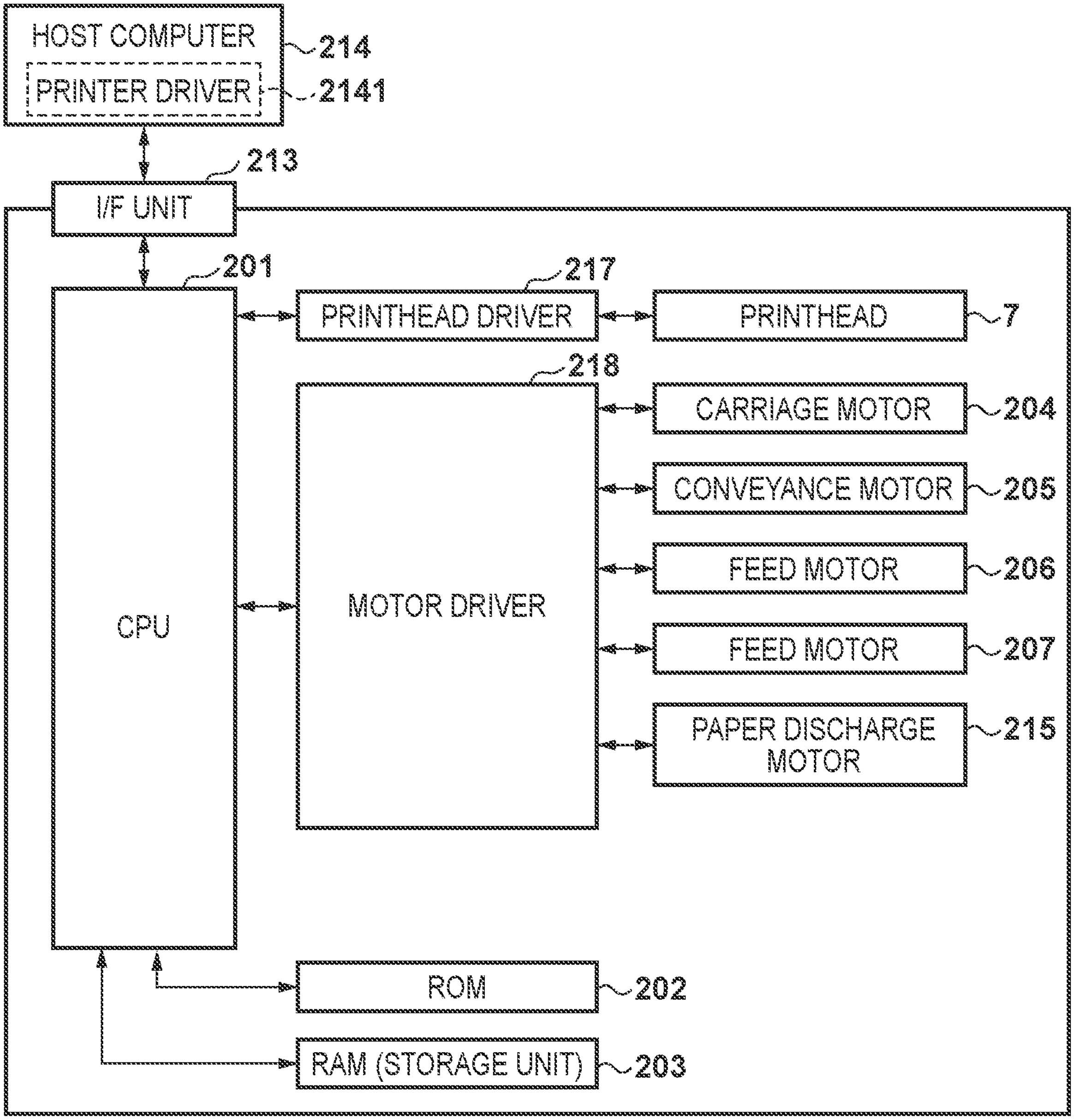
FIG. 2 is a block diagram showing an example of the system arrangement of the printing apparatus.
FIG. 3 is a view showing an aspect of a printing order.

FIG. 2 is a block diagram showing an example of the system arrangement of the printing apparatus 9. The printing apparatus 9 further includes a CPU 201, a ROM 202, a RAM 203, and an interface (I/F) unit 213.

The central processing unit (CPU) 201 controls the operation of each element and performs arithmetic processing required for the control. Although described in detail later, the CPU 201 can control each roller described above to convey the two print media to be conveyed consecutively such that the trailing end portion of one preceding print medium overlaps the leading end portion of one succeeding print medium.

The read only memory (ROM) 202 holds information such as programs to be executed by the CPU 201 and data. The random access memory (RAM) 203 temporarily holds input data received from a host computer 214 via the I/F unit 213 and also temporarily holds the processed data obtained by arithmetic processing by the CPU 201.

The printing apparatus 9 further includes a printhead driver 217, a motor driver 218, and motors 204, 205, 206, 207, and 215. The motor driver 218 individually controls the motors 204, 205, 206, 207, and 215.

For example, the motor driver 218 drives the pickup roller 2 by performing drive control of the feed motor 206, and drives the feed roller 3 by performing drive control of the feed motor 207, thereby conveying the print medium P from the sheet stacking unit 11 to the printing position where the printhead 7 performs printing.

In response to the detection of the passage of the print medium P by the detection sensor 16, the motor driver 218 drives the conveyance rollers 5 and 10 by performing drive control of the conveyance motor 205 to move the print medium P relative to the printhead 7. During this movement, the motor driver 218 drives the carriage 1 by performing drive control of the carriage motor 204, thereby scanning the printhead 7. Together with this operation, the printhead driver 217 implements printing on the print medium P by performing drive control of the printhead 7.

Subsequently, the motor driver 218 drives the conveyance roller 20 and the paper discharge roller 22 by performing drive control of the paper discharge motor 215, thereby discharging the printed print medium P to the paper discharge unit 25.

This embodiment, in which the printhead 7 is a serial head, is configured to alternately repeat the operation (intermittent conveying operation) of intermittently conveying the print medium P with the conveyance roller 5 by a predetermined amount at a time and the operation (scanning operation) of discharging ink from the printhead 7 while scanning the printhead 7 with the carriage 1 between intermittent conveyances (that is, during the inhibition of the conveyance of the print medium P). With this operation, printing is performed on the print medium P.

In this case, other rollers (not shown) can be driven in the same manner by the motor driver 218 and the corresponding motors.

The host computer 214 includes a printer driver 2141 for communicating with the printing apparatus 9. Upon receiving an operation input for instructing the execution of printing from the user, the host computer 214 outputs data indicating a print image as a printing job together with print information indicating its quality or the like. In the printing apparatus 9, the CPU 201 performs arithmetic processing upon receiving a print job via the I/F unit 213 and controls the drivers 217 and 218 based on the processing result.

<Printing Operation Accompanying Successive Overlapped Conveyance>

Figure 4:
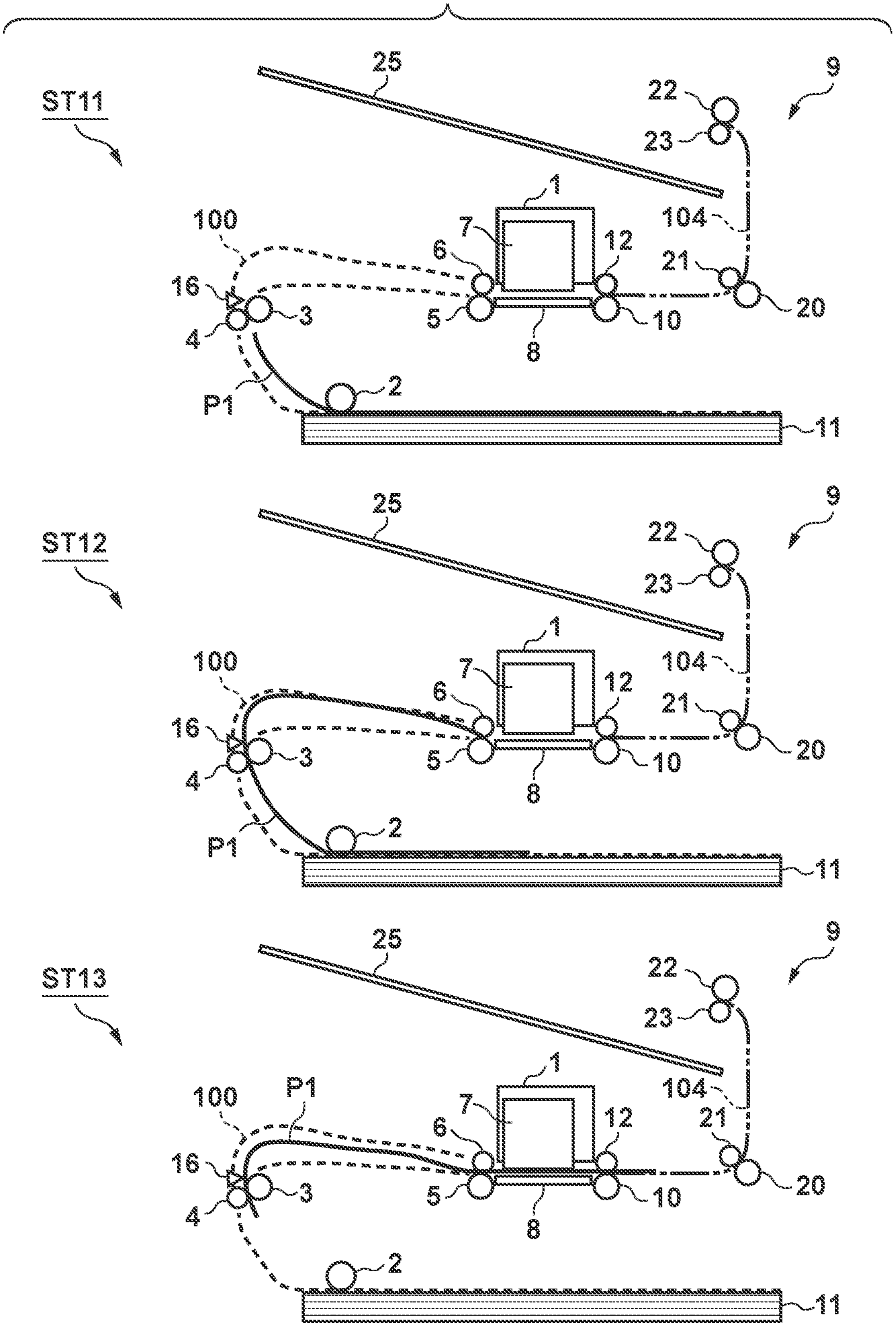
FIG. 4 is a schematic side view showing an example of the printing apparatus in each state.
Figure 5:
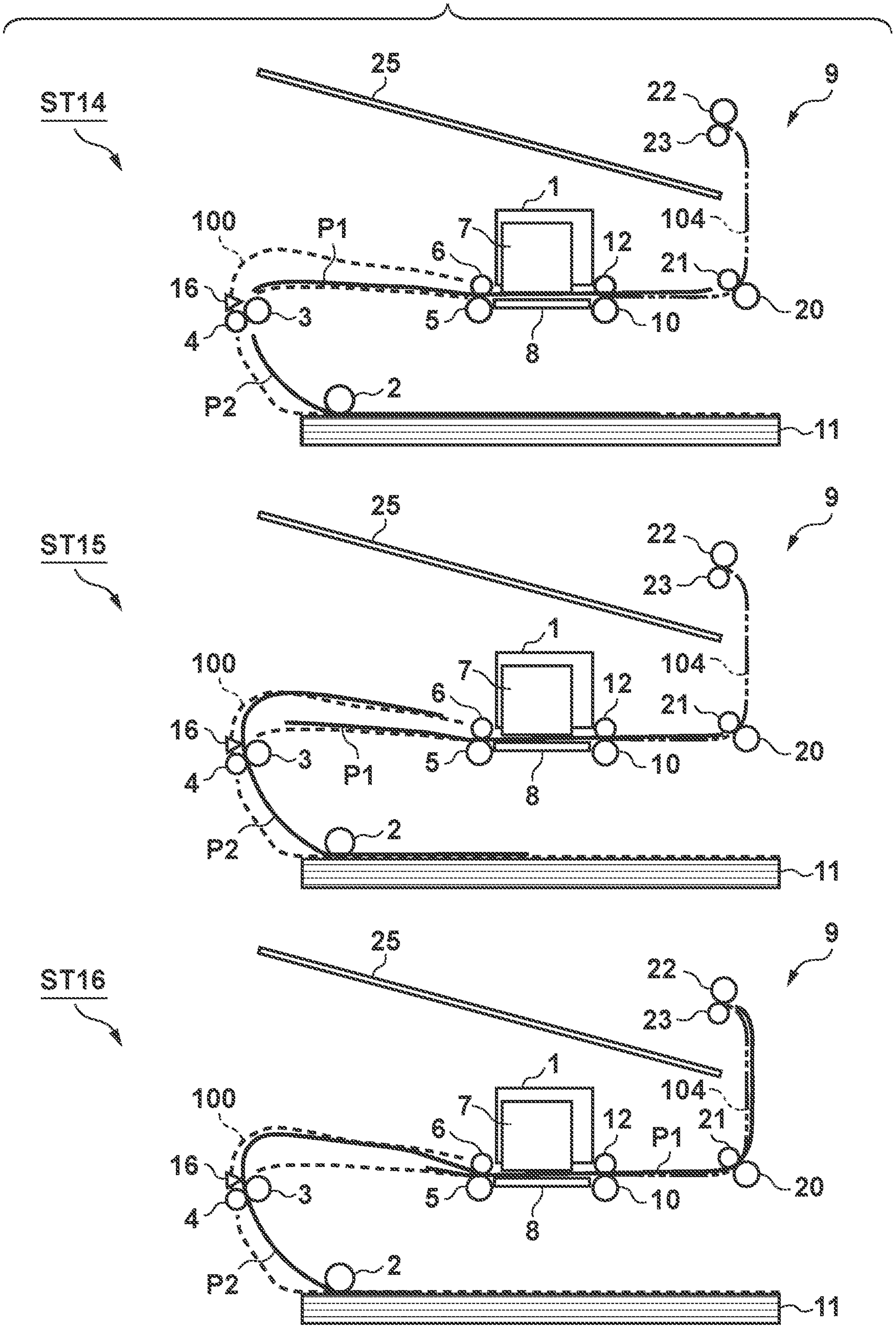
FIG. 5 is a schematic side view showing an example of the printing apparatus in each state.
Figure 6:
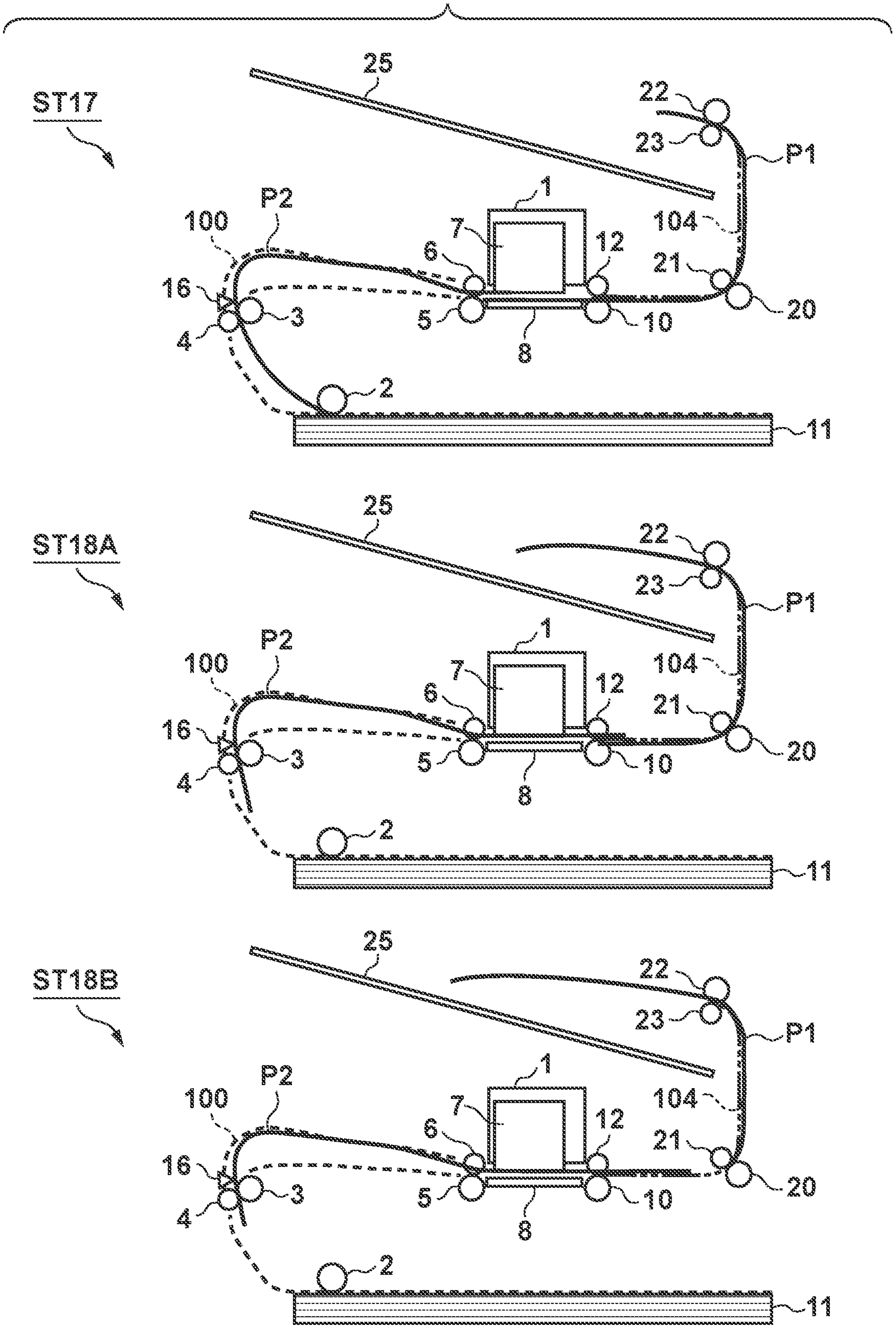
FIG. 6 is a schematic side view showing an example of the printing apparatus in each state.

The following case will exemplify a printing operation with reference to FIGS. 4 to 6 like FIG. 1 when one print job includes two-page print data respectively corresponding to the two sheets of the print media P.

FIG. 3 shows a mode of a printing order, that is, the operation of performing printing based on the first-page print data on the first print medium P and then performing printing based on the second-page print data on the second print medium P. Note that the printing order in this case is set according to a scheme of discharging the print medium P in a posture in which the obverse surface (printing surface) faces down, that is, the so-called face down scheme, and is not limited to this case.

As shown in FIG. 4, first of all, the feed motor 206 is driven at a relatively low speed to rotate the pickup roller 2 at 7.6 inches/sec (state ST11). The pickup roller 2 is rotated to pick up one uppermost sheet of the plurality of print media P (to be referred to as a first print medium P1) stacked on the sheet stacking unit 11. The feed roller 3 is driven by the feed motor 207 to rotate at substantially the same speed as that of the pickup roller 2 in the same direction, and the picked-up print medium P1 is then conveyed by the feed roller 3.

For the sake of easy description, the driving mode or the conveyance mode (driving at 7.6 inches/sec) at this time is expressed as low-speed driving or low-speed conveyance.

As described above, a one-way roller is used as the pickup roller 2. After the pickup roller 2 rotates until the print medium P1 passes through the feed roller 3, the pickup roller 2 idles by inhibition of the driving. Thereafter, the print medium P1 is continuously conveyed by the feed roller 3.

The detection sensor 16 detects the print medium P1 conveyed in this manner. When the detection sensor 16 detects the leading end of the print medium P1, the driving mode of the feed motor 207 is switched to drive the feed motor 207 at a relatively high speed, thereby rotating the feed roller 3 at 20 inches/sec.

For the sake of easy description, the driving mode or the conveyance mode (driving at 20 inches/sec) will be expressed as high-speed driving or high-speed conveyance hereinafter.

Subsequently, the feed roller 3 continues to rotate, and the leading end of the print medium P1 abuts against the conveyance nip formed by the rollers 5 and 6 (state ST12). At this time, the conveyance roller 5 is set in a halt state/non-driven state. After the leading end of the print medium P1 abuts against the conveyance nip portion formed by the rollers 5 and 6, the feed roller 3 rotates by a predetermined amount to align the print medium P1 while its leading end abuts against the conveyance nip portion, thereby correcting the skew of the print medium (skew correcting operation).

After the skew correcting operation for the print medium P1 is completed, the conveyance motor 205 is driven to start rotating the conveyance roller 5. This causes the conveyance roller 5 to convey the print medium P1 at 15 inches/sec (state ST13). After the print medium P1 reaches a printing operation start position at which the print medium P1 faces the printhead 7, the printhead 7 starts printing based on print data on the print medium P1.

Note that the operation of adjusting the print medium P1 at the printing operation start position is performed by positioning the print medium P1 by causing the leading end of the print medium P1 to abut against the conveyance nip portion (the rollers 5 and 6) using the conveyance roller 5 and then rotating the conveyance roller 5 by a predetermined amount with reference to the position of the print medium P1.

When the print medium P1 is adjusted to the printing operation start position, the feed motor 207 is switched to low-speed driving, thereby rotating the feed roller 3 at 7.6 inches/sec. During the execution of the printing operation, the print medium P1 is intermittently conveyed. During this period, the conveyance roller 5 is intermittently driven. The feed motor 207 intermittently drives the feed roller 3 in synchronism with this driving. At this time, the driving forces of the rollers 3 and 5 are adjusted to set the print medium P1 in a pulled state between the rollers 3 and 5. With this adjustment, the rotational speed (rotation amount) of the feed roller 3 in the absence of the print medium P1 is lower than that of the conveyance roller 5. Accordingly, the feed roller 3 is rotated by the conveyance roller 5 through the print medium P1. That is, the feed roller 3 rotates at the same rotational speed as that of the conveyance roller 5.

Note that while the print medium P1 is intermittently conveyed, the paper discharge motor 215 intermittently drives the conveyance roller 20 like the conveyance roller 5.

As shown in FIG. 5, subsequently, like the print medium P1, the succeeding print medium P (a second print medium P2) is picked up by the pickup roller 2 and then conveyed by the feed roller 3 (state ST14). In this state, the printhead 7 is performing printing on the print medium P1. When the detection sensor 16 detects the leading end of the print medium P2, the feed motor 207 is switched to high-speed driving to rotate the feed roller 3 at 20 inches/sec.

In this case, in order to allow the detection sensor 16 to properly detect an end portion of each print medium P, in consideration of the responsiveness and the like of the detection sensor 16, a predetermined interval is required between the two print media P conveyed consecutively. Accordingly, in order to allow the detection sensor 16 to detect the leading end of the succeeding print medium P2 after detecting the trailing end of the print medium P1, an interval corresponding to the time responsiveness of the detection sensor 16 needs to be provided between the trailing end of the print medium P1 and the leading end of the succeeding print medium P2.

In this embodiment, the print medium P2 is picked up in response to the detection of the passage of the trailing end of the print medium P1 through the detection sensor 16. The pickup roller 2 is controlled to form an interval equal to or larger than a predetermined distance between the trailing end of the print medium P1 and the leading end of the print medium P2.

After state ST14, the print medium P2 is conveyed at a speed higher than that of the printed print medium P1 by the printhead 7 conveyed downstream (the speed of the print medium P1 currently conveyed; the same applies below) (state ST15). This causes the leading end of the print medium P2 to overlap above the trailing end of the print medium P1. Continuously driving the feed roller 3 at a rotational speed of 20 inches/sec in response to the detection of the leading end of the print medium P2 by the detection sensor 16 will cause the leading end of the print medium P2 to catch up to the trailing end of the print medium P1. The print medium P2 is conveyed by the feed roller 3 until the leading end of the print medium P2 reaches a predetermined position on the upstream side of the conveyance nip portion (the rollers 5 and 6). The position of the leading end of the print medium P2 can be calculated from the rotation amount of the feed roller 3 from the time when the leading end of the print medium P2 is detected by the detection sensor 16. The feed roller 3 is controlled based on the calculation result.

Subsequently, while the conveyance roller 5 is stopped to perform the last scanning of the printhead 7 on the print medium P1 (which can be expressed as the printing of the last line, the image formation of the last line, or the like), the feed roller 3 is driven to cause the leading end of the print medium P2 to abut against the conveyance nip portion, thereby correcting the skew of the print medium P2 (state ST16).

As shown in FIG. 6, in response to the completion of the last scanning of the printhead 7 on the print medium P1, the conveyance roller 5 is rotated by a predetermined amount (state ST17). This will adjust the print medium P2 at the printing operation start position while maintaining the state in which the print medium P2 overlaps the print medium P1.

When the print medium P2 is adjusted at the printing operation start position, the feed motor 207 is switched to low-speed driving as in a printing operation for the print medium P1, thereby rotating the feed roller 3 at 7.6 inches/sec. During the execution of a printing operation, the print medium P2 is intermittently conveyed, and the printhead 7 starts the next printing based on print data on the print medium P2. When the print medium P2 is intermittently conveyed, the print medium P1 is also intermittently conveyed.

In this manner, while the succeeding print medium P2 overlaps the preceding print medium P1, a conveying operation is performed (to be referred to as successive overlapped conveyance hereinafter).

<Printing Medium Separating Operation>

In the above successive overlapped conveyance, it is conceivable that when paper discharging is performed in a face-down manner in this state, the order of sheets is interchanged. This can cause a deterioration in paper discharging performance.

Although described in detail later in this embodiment, the operation of separating (to be referred to as a separating operation hereinafter) the print medium P1 and the print medium P2 is performed to prevent a deterioration in paper discharging performance by performing paper discharging while the print media do not overlap each other.

At least two rollers are used to implement a separating operation. In this embodiment, one of these rollers which is located on the upstream side is the conveyance roller 10, and the other roller on the downstream side is the conveyance roller 20. Whether the trailing end of the print medium P1 has passed through the conveyance roller 10 (state ST18A) is determined based on the rotation amount of the conveyance roller 5 from the start of a printing operation on the print medium P and the length of the print medium (sheet length).

Figure 7A:
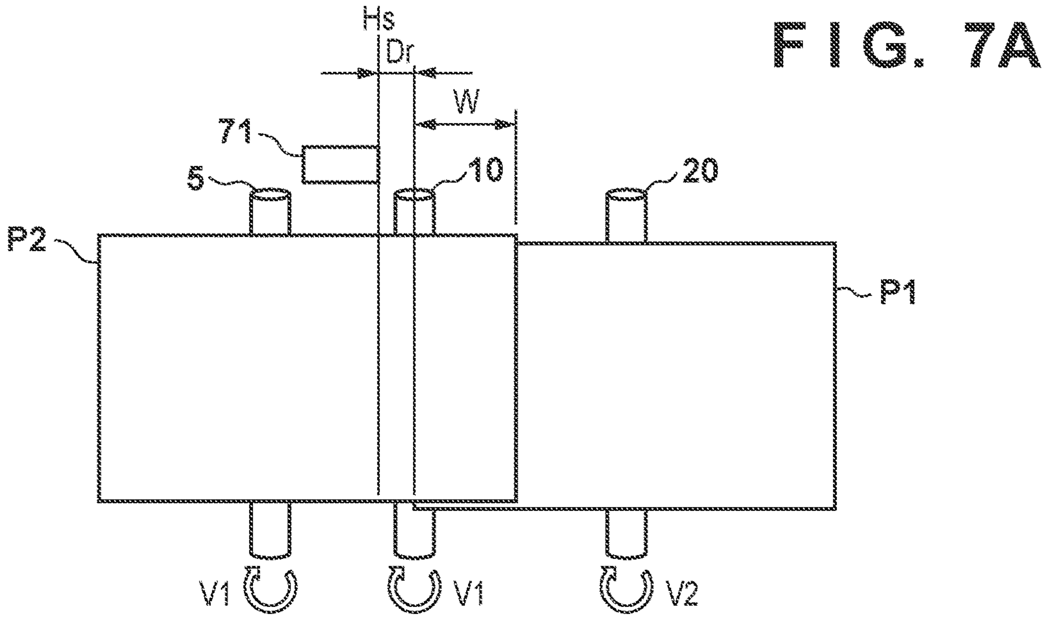
FIGS. 7A to 7C are schematic top views showing an example of the printing apparatus in each state.

FIG. 7A is a schematic top view showing the state ST18A. In this state, the paper discharge motor 215 continuously rotates the conveyance roller 20 and the paper discharge roller 22 independently of the conveyance rollers 5 and 10, thereby implementing a separating operation.

Note that in this embodiment in which the printing apparatus 9 is a serial printer, during the execution of a separating operation, an intermittent conveying operation for the print medium P and the scanning operation of the printhead 7 between the intermittent conveyances are alternately repeated.

In this case, as shown in FIG. 7A, V1 represents the conveying speed of the conveyance rollers 5 and 10, and V2 represents the conveying speed of the conveyance roller 20 and the paper discharge roller 22. In addition, W represents the overlap amount between the print media P1 and P2, Dr represents the distance from the separation start position to the most downstream position of the nozzle 71. A most downstream position Hs of the nozzle 71 is calculated as W+Dr from the leading end of the print medium P2.

Note that the conveying speed of the conveyance roller 20 and the paper discharge roller 22 is provided with an upper limit V2max ($V2max \geq V2$) for the prevention of noise, low power consumption, or the like as a purpose. Although described in detail later, a wait operation of stopping the conveyance rollers 5 and 10 can be performed.

After the separating operation is started, the conveyance roller 20 conveys the print medium P1, and the trailing end passes through the conveyance roller 20 (state ST18B).

Figure 7B:
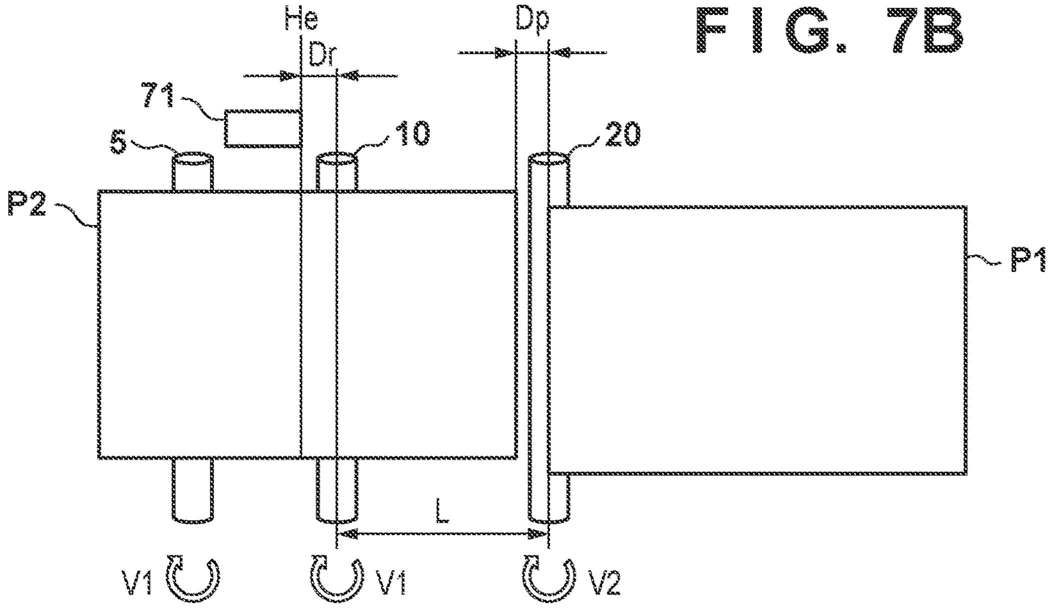

FIG. 7B is a schematic top view showing the state ST18B. In this state, although described in detail later, the speed of the conveyance roller 20 and the time and timing of a wait operation are controlled so as to complete the separating operation when the interval between the trailing end of the print medium P1 and the leading end of the print medium P2 becomes a distance Dp ($Dp \geq 0$ (preferably $Dp > o$)). This will properly separate the print media P1 and P2 from each other and cancel the state in which the trailing end of the print medium P1 overlaps the leading end of the print medium P2.

In this case, as shown in FIG. 7B, L represents the distance from a separation start position to a separation end position. A most downstream position He of a nozzle 71 is calculated as L−Dp+Dr from the leading end of the print medium P2.

Figure 7C:
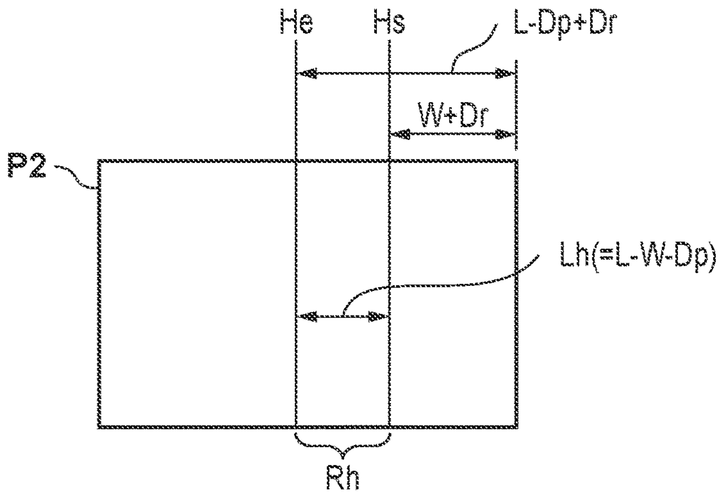

FIG. 7C is a schematic view for comparison between the positions Hs and He described above. The region between the positions Hs and He corresponds to a region on a sheet at which a separating operation is executed with reference to the most downstream position of the nozzle 71 and will be referred to as a separation region Rh. A distance (length or width) Lh of the separation region Rh is calculated as $$Lh = L - W - Dp$$

and the separation region Rh corresponds to a region where the print medium P2 passes through the conveyance roller 10 in the interval between the instant when the trailing end of the print medium P1 passes through the conveyance roller 10 and the instant when the trailing end passes through the conveyance roller 20.

The driving mode for implementing a separating operation may be partially changed without departing the gist of the driving mode. For example, the positions Hs and He may be located at the most downstream position of the nozzle 71 used in each printing operation and may be changed for each printing operation.

The timing when a separating operation is started may be after the timing when the trailing end of the print medium P1 passes through the conveyance roller 10. In addition, the timing when the separating operation is ended may be controlled such that the interval between the trailing end of the print medium P1 and the leading end of the print medium P2 becomes equal to or more than the distance Dp.

In this example, a separating operation is ended at the timing when the trailing end of the print medium P1 passes through the conveyance roller 20. In another example, the separating operation may be ended until the trailing end of the print medium P1 passes through an arbitrary point set in advance.

In this example, the rollers 10 and 20 are mainly used for a separating operation. However, in another example, when the conveyance roller 10 is a one-way roller, the rollers 5 and 10 may be mainly used for a separating operation. That is, of the two rollers mainly used for a separating operation, one roller on the upstream side may be positioned upstream or downstream of the printhead 7.

<Wait Operation>

As described above, the conveying speed of the conveyance roller 20 and the paper discharge roller 22 is provided with an upper limit V2max. The conveying speed required for the execution of a separating operation may exceed the upper limit speed depending on the contents of print data.

Accordingly, in this embodiment, a wait operation can be executed during the execution of a separating operation. In a wait operation, while an intermittent conveying operation for the print medium P and the scanning operation of the printhead 7 between the conveyances are alternately repeated, the conveyance rollers 5 and 10 are stopped. A printing operation performed by alternately repeating an intermittent conveying operation and a scanning operation is interrupted by a wait operation.

Figure 8A:
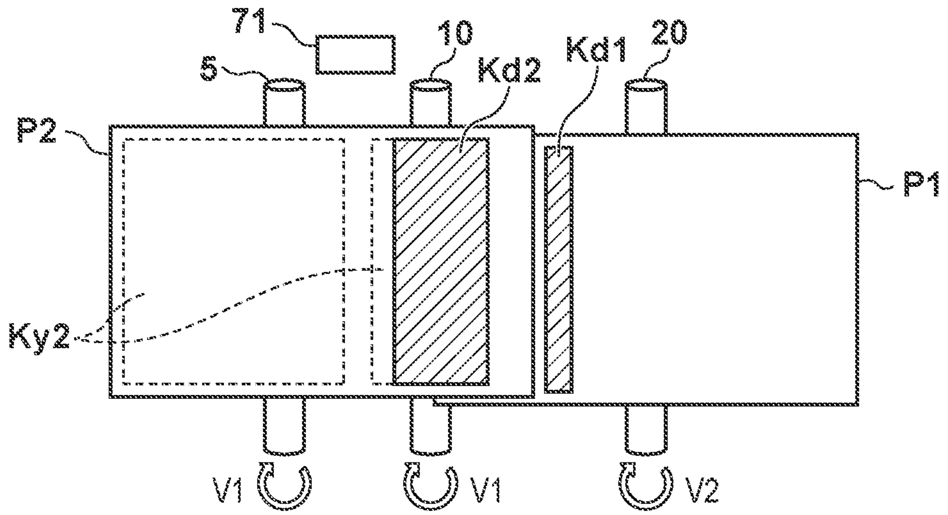
FIGS. 8A and 8B are schematic top views showing an example of the printing apparatus in each state.
Figure 8B:
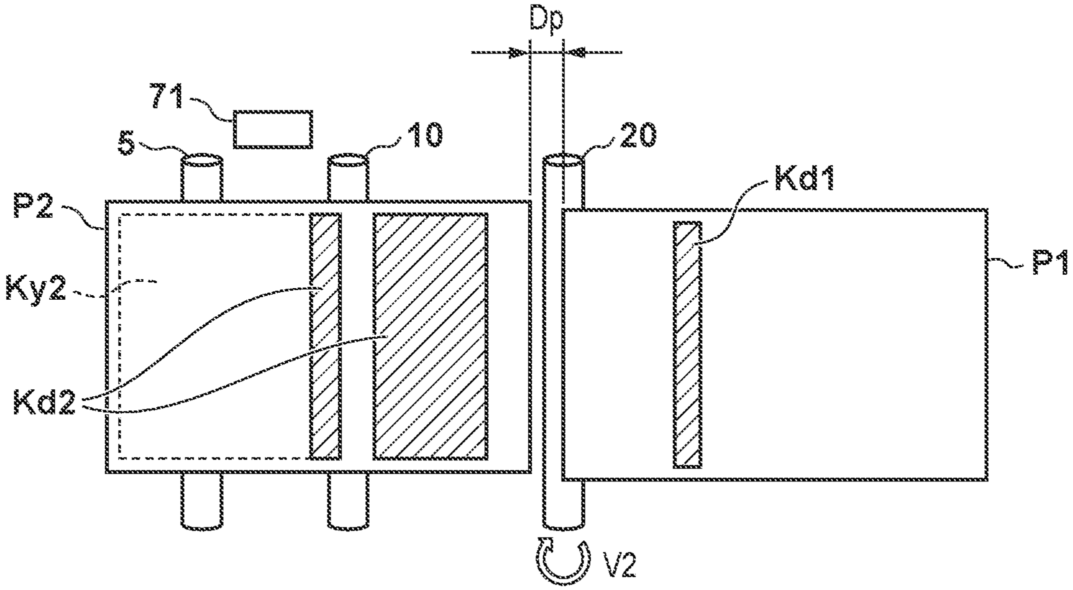

A description will be made with reference to FIGS. 8A and 8B in a case where a wait operation is executed during the execution of a separating operation, which is also a case where a printing operation to be continued is interrupted by a wait operation. FIG. 8A is a schematic top view showing the timing when a separating operation is started. FIG. 8B is a schematic top view showing the timing when the separating operation is ended during the execution of a wait operation.

In this state, the conveyance rollers 5 and 10 are stopped, and the region immediately below the nozzle 71 is ready for printing. A region Kd1 in FIG. 8B indicates a printed region on the preceding print medium P1. A region Kd2 in FIG. 8B indicates a printed region on the succeeding print medium P2. A region Ky2 in FIG. 8B indicates a to-be-printed (non-printed) region on the succeeding print medium P2.

In this case, when a wait operation is performed in the state in FIG. 8B, the time difference since ink is discharged is relatively large between the printed region Kd2 on which printing has been performed before a wait operation and the to-be-printed region Ky2 on which printing is to be performed after the wait operation. This can be a cause for color unevenness between the regions Kd2 and Ky2 on the same print medium P2 due to the time difference until ink is dried and eventually can be a cause for a deterioration in print quality.

Accordingly, a wait operation is preferably performed on the to-be-printed region Ky2 which is not continuous with the printed region Kd2. A region where such a wait operation can be executed will be described as a wait enable region.

Figure 9A:
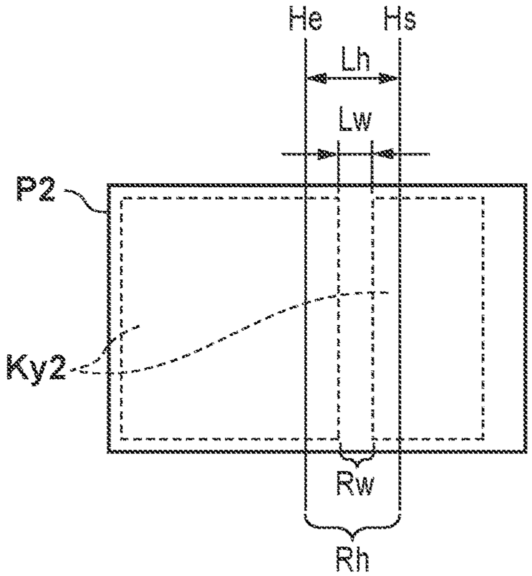
FIGS. 9A to 9C are schematic top views showing an example of the printing apparatus in each state.

As exemplarily shown in FIG. 9A, the region between the two to-be-printed regions Ky2 spaced away from each other is defined as a wait enable region Rw, and the distance (length or width) between the two to-be-printed regions is represented by Lw. In this case, the to-be-printed region Ky2 changes to the printed region Kd2 after printing is performed. Accordingly, the wait enable region Rw can also be a region other than the to-be-printed region Ky2 in the state before a printing operation, and in short can be a region other than a print target or a region on which no scanning operation is performed.

A wait operation is performed at the timing when the region common to the separation region Rh and the wait enable region Rw includes the most downstream position of the nozzle 71 (a calculation method for the timing will be described in detail later). This makes it possible to suppress or reduce the deterioration in print quality described above. As an example, a wait operation is preferably performed when the most downstream position of the nozzle 71 is located on the upstream end of the region common to the separation region Rh and the wait enable region Rw.

Figure 9B:
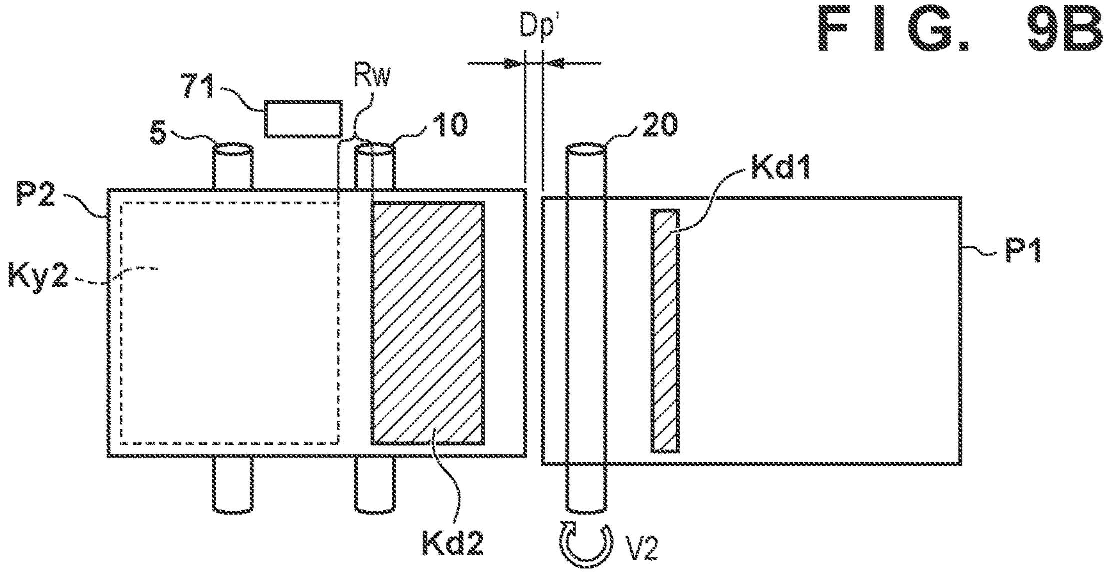

FIG. 9B shows a mode in which a wait operation according to this embodiment can be properly executed during the execution of a separating operation. Note that a distance Dp' between the trailing end of the print medium P1 and the leading end of the print medium P2 in this case is smaller than the distance Dp described above (Dp'<Dp). During the execution of a wait operation, the driving of the conveyance rollers 5 and 10 and a printing operation for the region immediately below the nozzle 71 are suppressed.

Figure 9C:
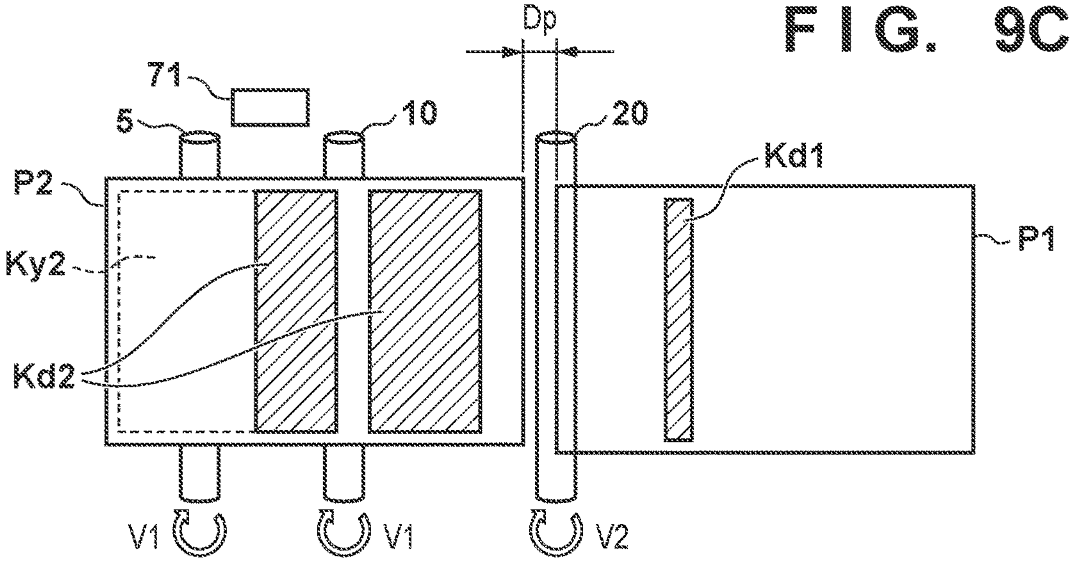

FIG. 9C shows a state in which the distance between the trailing end of the print medium P1 and the leading end of the print medium P2 becomes the distance Dp, and the separating operation is ended. In accompanying with this operation, the intermittent conveyance by the conveyance rollers 5 and 10 is resumed (the conveying speed V1), that is, the wait operation is ended.

Figure 10:
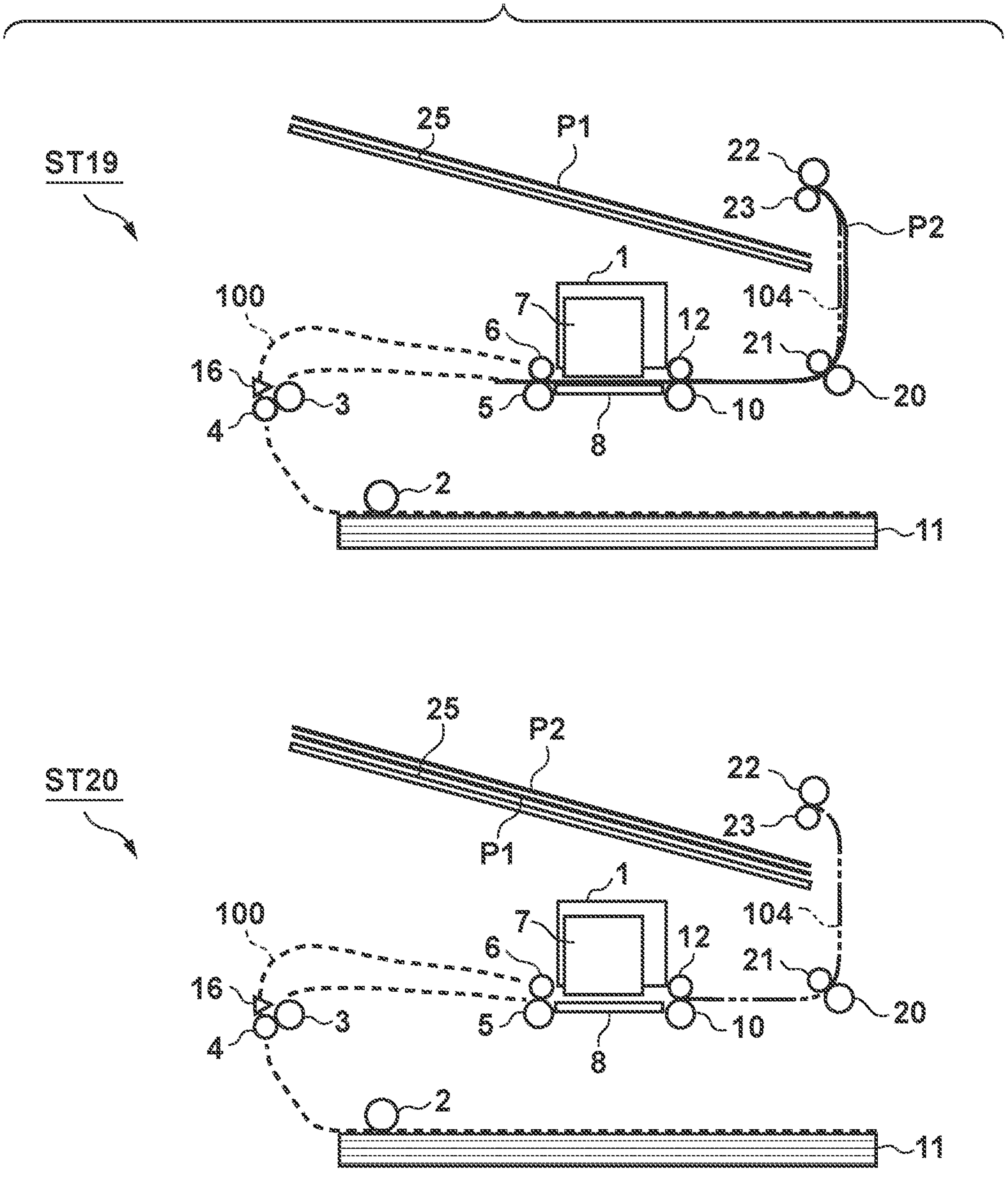
FIG. 10 is a schematic side view showing an example of the printing apparatus in each state.

As shown in FIG. 10, the printed print medium P1 is discharged in this manner onto the paper discharge unit 25 by the conveyance roller 20 and the paper discharge roller 22 (state ST19). With a similar procedure, the print medium P2 having undergone printing is discharged onto the paper discharge unit 25 by the conveyance roller 20 and the paper discharge roller 22 (state ST20).

In this manner, successive overlapped conveyance, a separating operation, and a wait operation are performed to perform a printing operation for the plurality of print media P. Although each operation has been described by exemplifying the case of one-side printing, the contents described above can also be applied to the case of two-sided printing.

<Contents of Control for Execution of Successive Overlapped Conveyance>

The contents of control for implementing a printing operation accompanying successive overlapped conveyance according to this embodiment will be described with reference to FIGS. 11A to 15. Generalized control contents will be described by using, as parameters, a printing order N, a page K in print data, and a page count M of print media (N is an arbitrary integer from 1 to Nmax) as exemplified in FIG. 3.

Assume that N, K, and M correspond to each other, that is, N is an integer from 1 to Nmax, and printing is performed on the N(K)th page of the N(M)th print medium at the Nth turn.

Figure 11A:
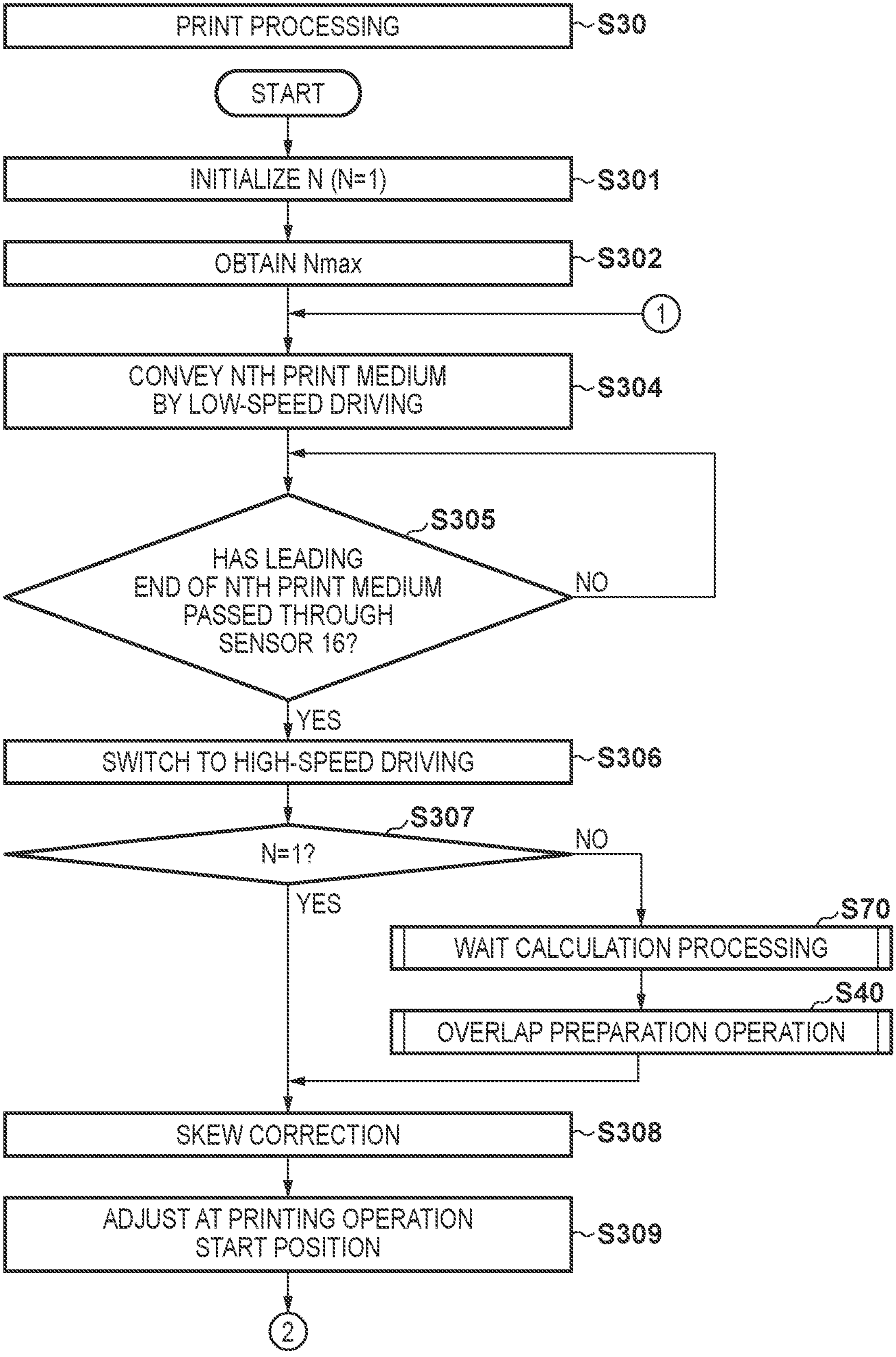
FIGS. 11A and 11B are flowcharts showing overall control contents at the time of execution of a printing operation.
Figure 11B:
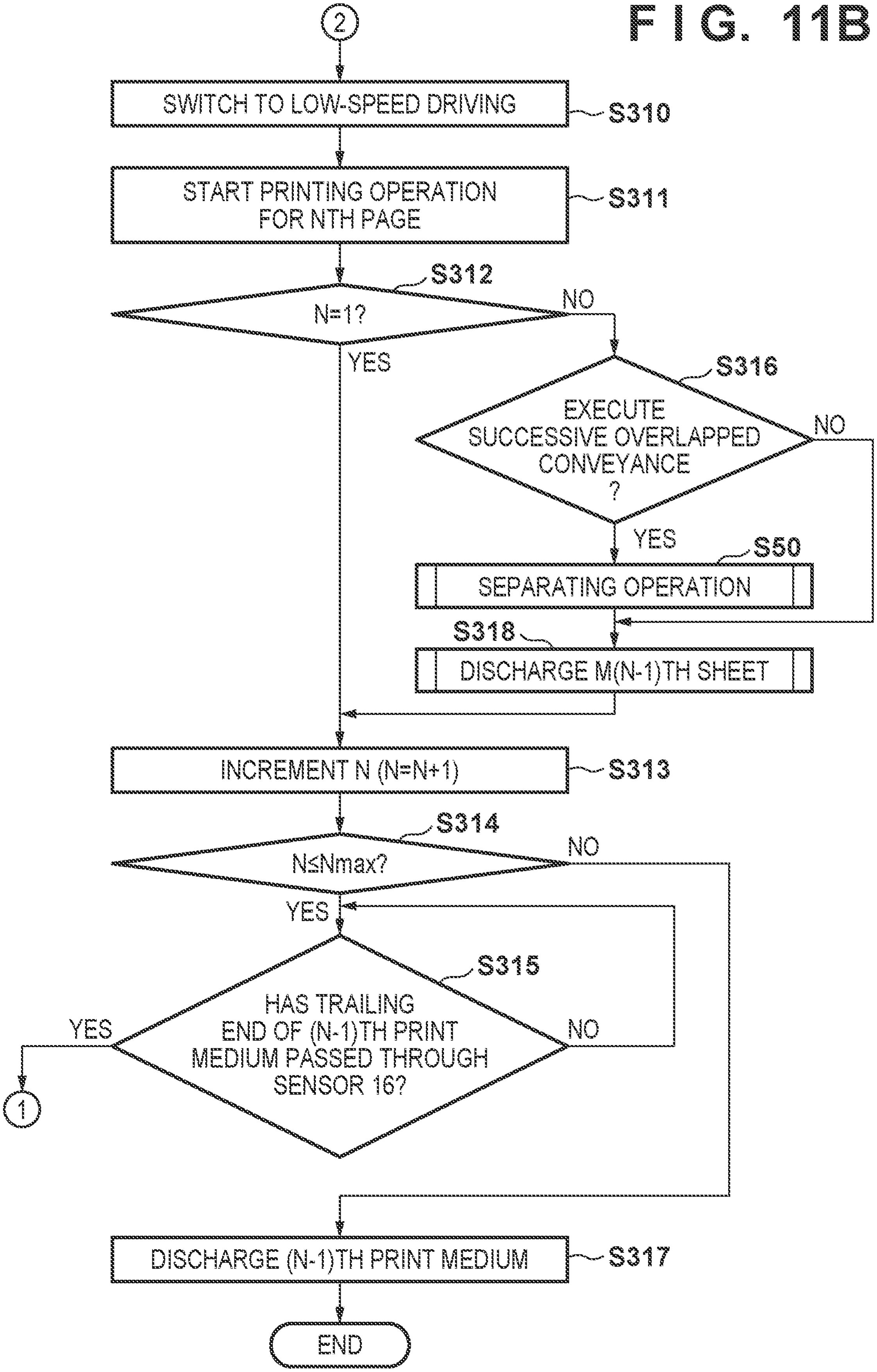

FIGS. 11A and 11B show flowchart S30 indicating overall control contents at the time of the execution of a printing operation. Flowchart S30 can be executed mainly by the CPU 201.

In step S301 (to be simply referred to as “S301” hereinafter; the same applies to the other steps to be described later), the parameter N is initialized as N=1. In S302, the parameter Nmax is obtained based on print data. In S304, the Nth print medium is started to be fed by low-speed driving (conveying speed of 7.6 inches/sec).

In S305, it is determined whether the leading end of the Nth print medium has passed through the sensor 16. If the leading end of the Nth print medium has passed through the sensor 16 (YES in the determination), the process advances to S306; otherwise (NO in the determination), the process returns to S305.

In S306, the conveyance mode of the Nth print medium is switched to high-speed driving (conveying speed of 20 inches/sec). With this operation, the leading end of the Nth print medium catches up the trailing end of the (N−1)th print medium.

In S307, it is determined whether N=1. If N=1 (YES in the determination), that is, there is no preceding print medium P that should be overlapped, the process advances to S308. In contrast to this, if N≠1 (NO in the determination), that is, there is a possibility that successive overlapped conveyance may be performed, wait calculation processing (to be described later) is executed in S70. Based on the processing result, overlap preparation operation (to be described later) is executed in S40.

Figure 12:
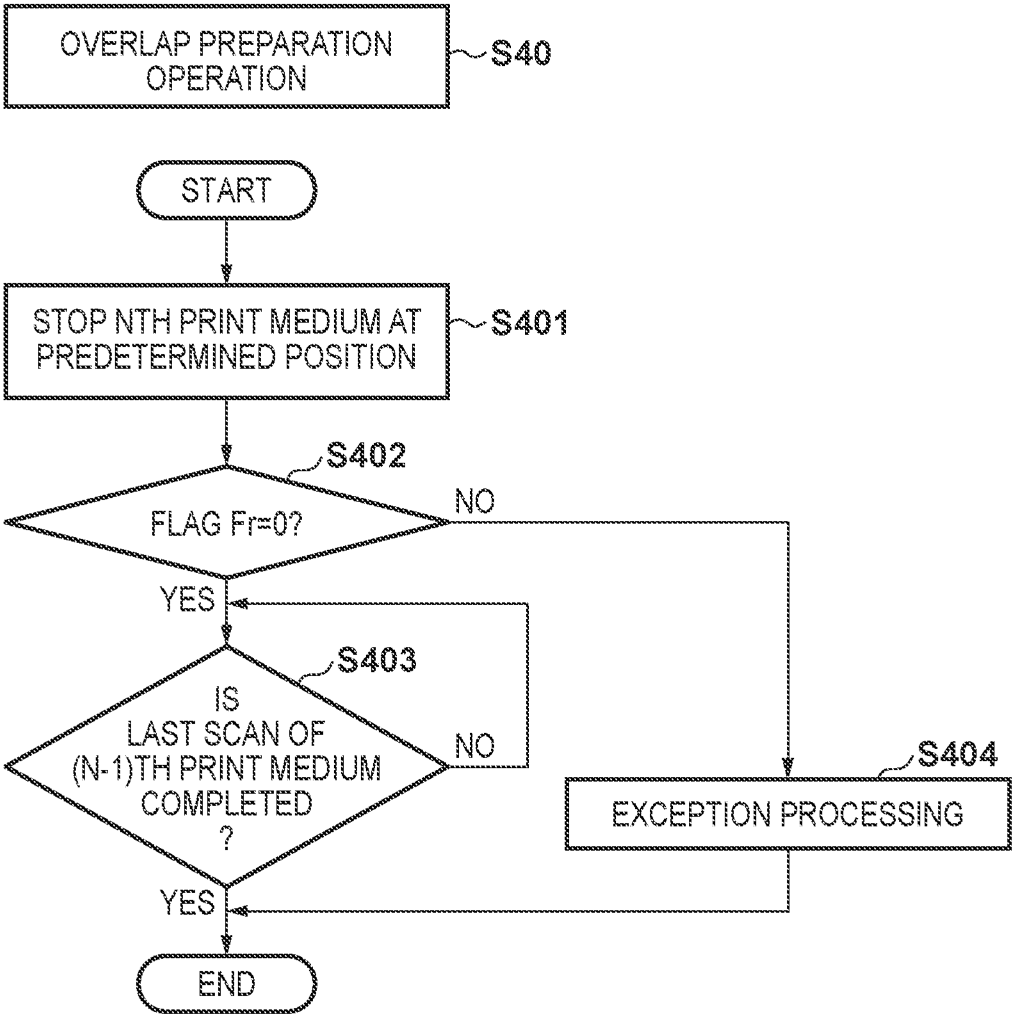
FIG. 12 is a flowchart showing the control contents of an overlap preparation operation.

FIG. 12 is a flowchart showing the control contents in overlap preparation operation S40. In S401, the Nth print medium is stopped at a predetermined position in front of the conveyance roller 5 based on the detection result obtained by the detection sensor 16 and the rotation amount of the feed roller 3.

In S402, it is determined whether exception processing flag Fr=0, which indicates whether exception processing (to be described later) is performed (Fr=0 indicates that exception processing is not performed, and Fr=1 indicates that exception processing is performed). If Fr=0 (YES in the determination), the process advances to S403; otherwise (NO in the determination), the process advances to S404.

Although described in detail later, the exception processing flag Fr can be calculated in wait calculation processing (S70) before the formation of an overlap state between the (N−1)th print medium and the Nth print medium by successive overlapped conveyance.

In S403, it is determined whether the last scanning of the printhead 7 with respect to the (N−1)th print medium is completed. If the last scanning is completed (YES in the determination), flowchart S40 is terminated, and the process advances to S308 in FIG. 11A; otherwise (NO in the determination), the process returns to S403.

In S404, exception processing is performed. In this embodiment, as an example, processing for canceling the overlap state between the (N−1)th print medium and the Nth print medium, more specifically, the conveyance of the succeeding Nth print medium is set standby until the preceding (N−1)th print medium passes through the conveyance roller 5. This prevents a wait operation from being needlessly performed during the execution of a separating operation, thereby suppressing or reducing a deterioration in print quality. As another example, a similar effect can also be obtained by adjusting the overlap amount W. For example, in order to reduce the overlap amount W, the (N−1)th print medium may be conveyed by a predetermined amount.

Referring to FIGS. 11A and 11B again, in S308, the skew of the Nth print medium is corrected. In this case, if it is determined in S307 that N=1 (YES in the determination in S307), the skew of the Nth print medium is independently corrected. If it is determined in S402 that Fr=0 (YES in the determination in S402), the skew of the Nth print medium is corrected in an overlap state with the (N−1)th print medium. In contrast to this, if it is determined in S402 that Fr=1 (NO in the determination in S402), the skew of the Nth print medium is independently corrected.

In S309, the Nth print medium is adjusted at a printing operation start position. If the skew of the Nth print medium is corrected in S308 in an overlap state with the (N−1)th print medium, the adjustment is performed in this state. In S310, the conveyance mode of the Nth print medium is switched to low-speed driving (a conveying speed of 7.6 inches/sec). In S311, a printing operation for the Nth page of the Nth print medium is started.

In S312, it is determined whether N=1. If N=1 (YES in the determination), the process advances to S313; otherwise (NO in the determination), the process advances to S316.

In S316, it is determined whether successive overlapped conveyance is executed. If successive overlapped conveyance is executed (YES in the determination), a separating operation is executed in S50, although described in detail later, and the process advances to S318; otherwise (NO in the determination), the process skips S50 and advances to S318. In S318, the (N−1)th print medium is discharged onto the paper discharge unit 25.

In S313, the parameter N is incremented (N=N+1).

In S314, it is determined whether N≤Nmax (YES in the determination), the process advances to S315; otherwise (NO in the determination), the process advances to S317.

In S315, it is determined whether the trailing end of the (N−1)th print medium has passed through the sensor 16. If the trailing end of the (N−1)th print medium has passed though the sensor 16 (YES in the determination), the process returns to S304; otherwise (NO in the determination), the process returns to S315.

In S317, the (N−1)th print medium is discharged. With this operation, printing on all the print media P is completed, and flowchart S30 is terminated.

<Wait Calculation Processing>

Figure 13:
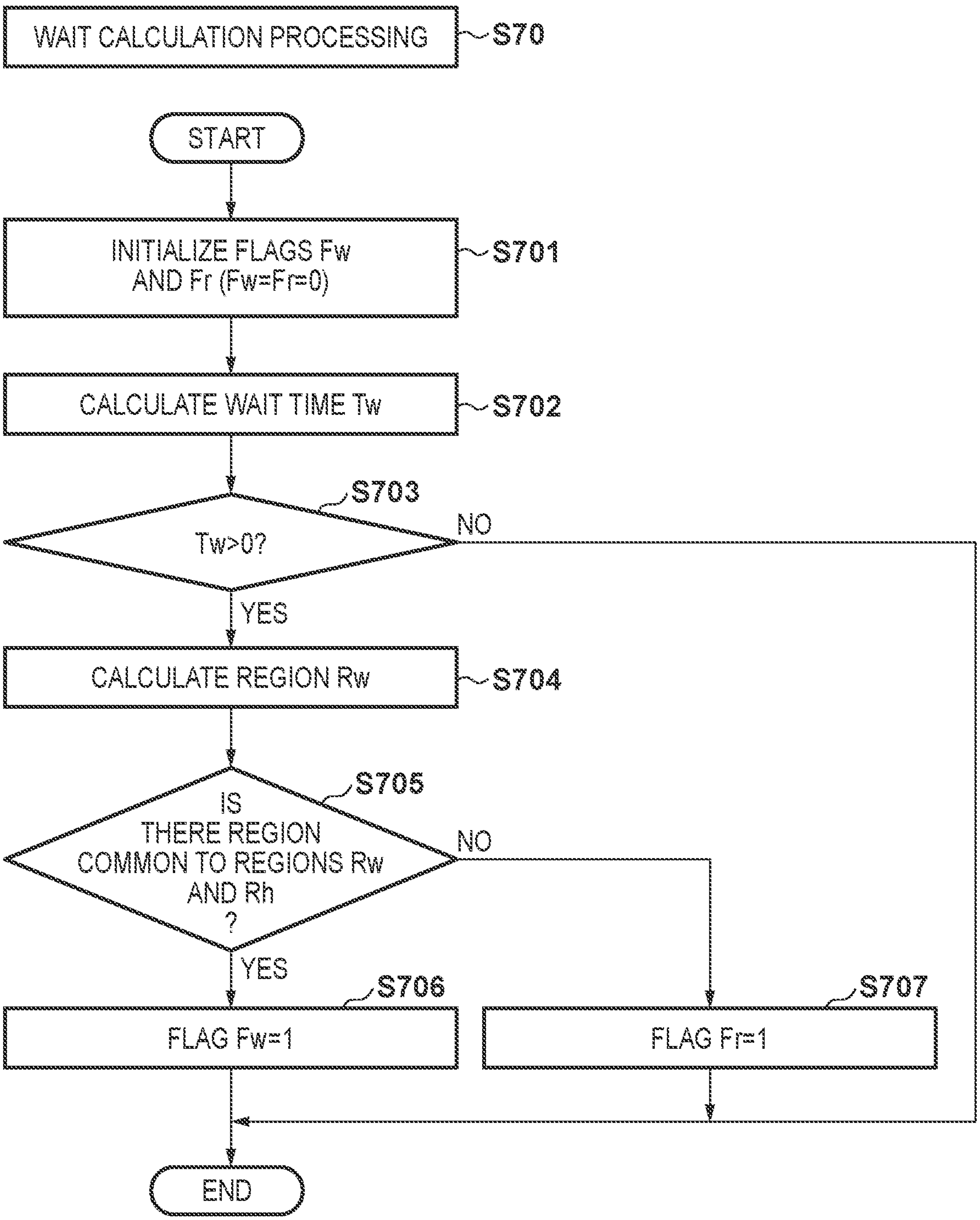
FIG. 13 is a flowchart showing the contents of wait calculation processing.

FIG. 13 is a flowchart showing the contents of wait calculation processing S70. Wait calculation processing is performed based on print data about the preceding print medium P and the succeeding print medium P.

The contents of wait calculation processing based on print data corresponding to the examples shown in FIGS. 8A to 9C will be described. A separating operation is started in the state in FIG. 8A. A wait operation is executed in the state in FIG. 9B. The separating operation in the state in FIG. 9C is ended. Assume that the relative positional relationship between the respective units at the start and end of a separating operation corresponds to the state shown in each of FIGS. 7A to 7C.

In S701, a wait execution flag Fw and an exception processing flag Fr are initialized, and Fw=0 and Fr=0 (Fw=0 indicates that no wait operation is executed, and Fw=1 indicates that a wait operation is executed. Note that the exception processing flag Fr is the same as that described above).

In S702, a wait time Tw is calculated. This calculation is performed on the premise that the conveying speed V2 of the preceding print medium P has an upper limit V2max. First of all, a separation enable time Tmax is calculated. As described above, FIG. 8A shows the timing when a separating operation is started, more specifically, the timing when the trailing end of the preceding print medium P (the print medium P1 described above) passes through the conveyance roller 10 upon conveyance of the print medium P by the conveyance roller 20. In this state, assume that the overlap amount between the preceding and succeeding print media P is W (see FIG. 7A), and the number of times of scanning that can be performed while the most downstream position of the nozzle 71 intermittently passes through the separation region Rh (the distance Lh of the separation region Rh) is a scan count Sc. Assume also that the required time per scan is a scan time Ts.

The separation enable time Tmax is calculated based on the overlap amount W, the scan count Sc, the scan time Ts, the distance Lh of the separation region Rh, and the conveying speed V1 of the succeeding print medium P.

$$
\begin{aligned}
T\max &= Lh/V1 + Sc \times Ts \\
&= (L - W - Dp)/V1 + Sc \times Ts
\end{aligned}
$$

Note that the conveying speed V1 of the succeeding print medium P is the conveying speed of the conveyance roller 10 in this embodiment.

Figure 14:
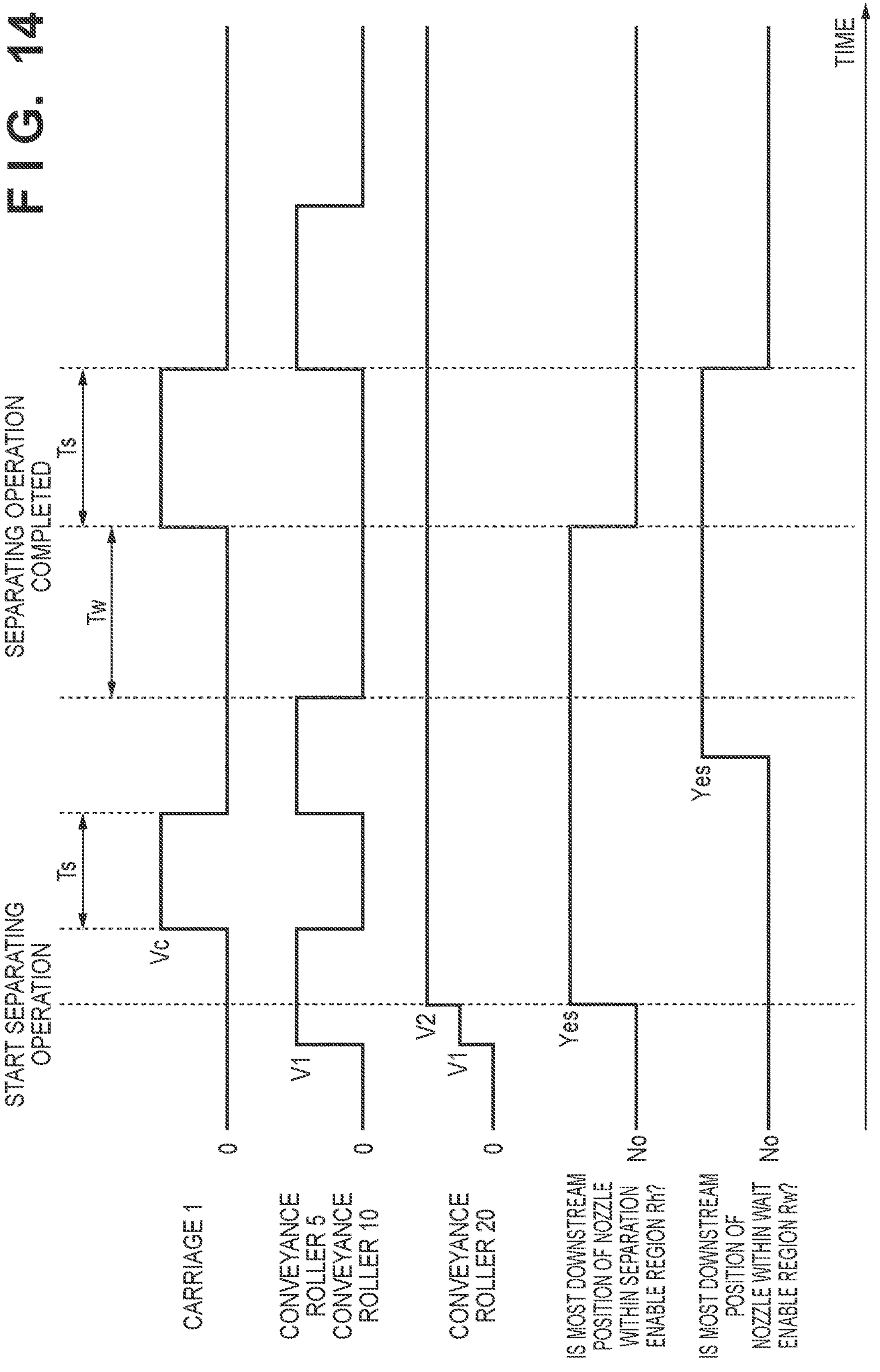
FIG. 14 is a timing chart showing the contents of drive control at the time of the execution of a separating operation.

FIG. 14 is a timing chart showing the contents of drive control on each mechanism at the time of the execution of a separating operation. FIG. 14 indicates that the conveyance rollers 5 and 10 are intermittently driven (conveying speed V1), and the carriage 1 is driven at a scanning speed Vc between the intermittent driving operations. Note that the driving of the carriage 1 is represented by a rectangular signal waveform in FIG. 14, but the scan time Ts can include acceleration and deceleration times before and after each scanning operation.

The conveyance roller 20 is driven at the conveying speed V1 or V2 and is driven at the conveying speed V2 when executing a separating operation.

In addition, if YES is obtained in determining whether the most downstream position of the nozzle 71 is located in the separation region Rh, the corresponding signal is set at high level, whereas if NO is obtained in the determination, the corresponding signal set at low level. Likewise, if YES is obtained in determining whether the most downstream position of the nozzle 71 is located in the wait enable region Rw, the corresponding signal is set at high level, whereas if NO is obtained in the determination, the corresponding signal is set at low level.

Assuming that conveying speed V2 (of preceding print medium P)=V2max, the wait time Tw can be calculated based on the separation enable time Tmax as $$Tw = L/V2\text{max} - T\text{max}$$

Referring to FIG. 13 again, it is determined in S703 whether wait time Tw>0. If Tw>0 (YES in the determination), the process advances to S704 upon determining that a wait operation is required; otherwise (NO in the determination), it is determined that a wait operation is not required, and flowchart S70 is terminated. The process then advances to S40 in FIG. 11A. In this state, wait execution flag Fw=0 (no wait operation is executed), and exception processing flag Fr=0 (no exception processing is executed).

In S704, the wait enable region Rw is calculated or specified based on the print data of the succeeding print medium P. As described above, a wait operation is performed in the wait enable region Rw that is a to-be-printed region (the above region Ky2 or the like) that is not continuous with a printed region (the above region Kd2) and is not the to-be-printed region Ky2 in a state before a printing operation (see FIG. 9A).

In S705, it is determined whether there is a region common to the wait enable region Rw and the separation region Rh. If there is a common region (YES in the determination), the process advances to S706 upon determining that a wait operation can be executed. If there is no common region (NO in the determination), the process advances to S707 upon determining that, although a wait operation is necessary, the wait operation is not executed to suppress or reduce a deterioration in printing quality.

In S706, wait execution flag Fw=1 (a wait operation is executed) is set. In S707, exception processing flag Fr=1 (exception processing is executed) is set. Thereafter, flowchart S70 is terminated, and the process advances to S40 in FIG. 11A.

<Separating Operation>

Figure 15:
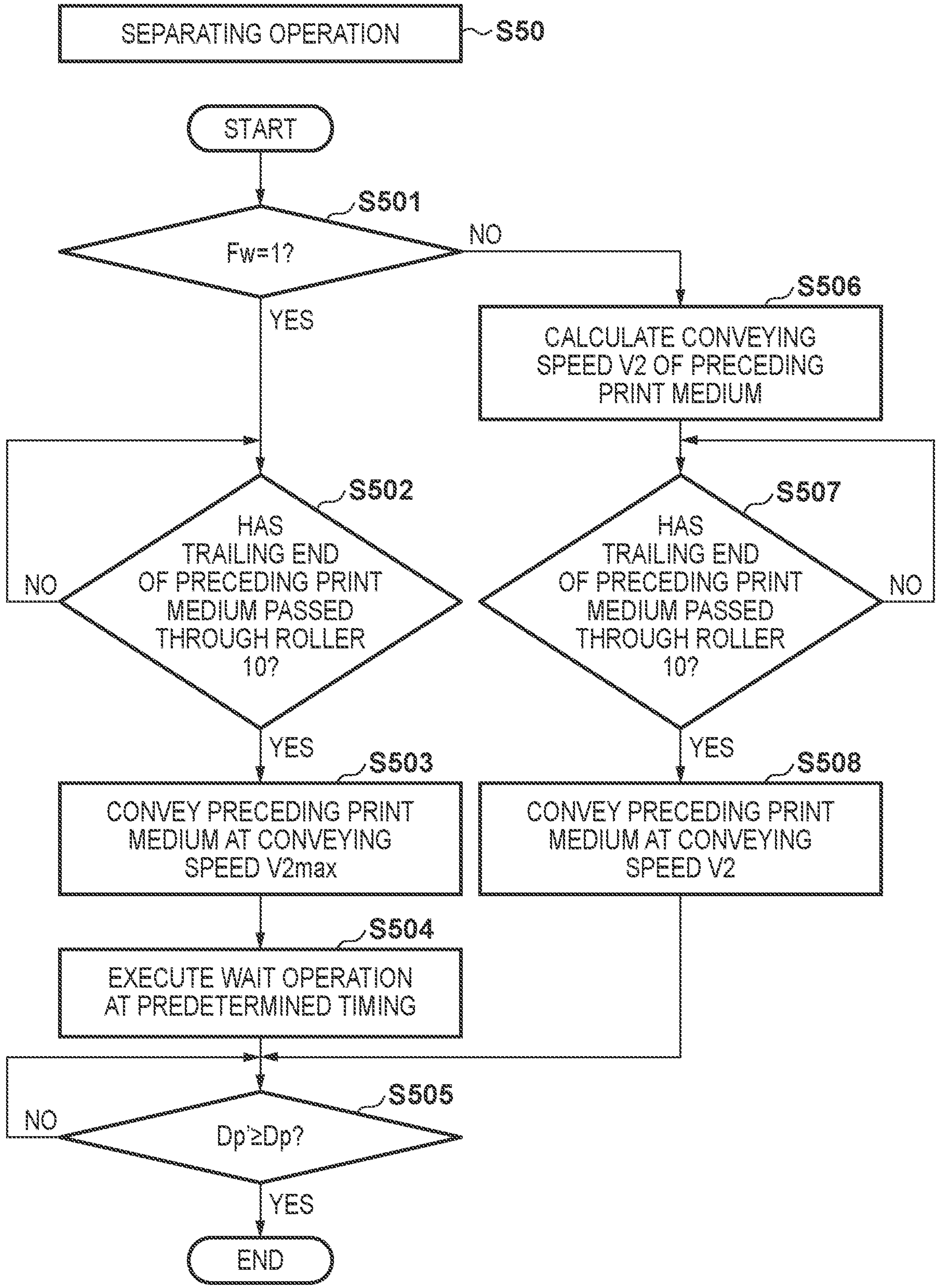
FIG. 15 is a flowchart showing control contents at the time of execution of a separating operation.

FIG. 15 is a flowchart showing control contents at the time of the execution of separating operation S50. In S501, it is determined whether wait execution flag Fw=1. If Fw=1 (a wait operation is executed) (YES in the determination), the process advances to S502; otherwise (NO in the determination), the process advances to S506.

In S502, it is determined whether the trailing end of the preceding print medium P has passed through the conveyance roller 10 (the upstream roller used in a separating operation). If the trailing end of the preceding print medium P has passed through the conveyance roller 10 (YES in the determination; for example, the state in FIG. 8A), the process advances to S503; otherwise (NO in the determination), the process returns to S502.

In S503, the conveyance roller 20 (the downstream roller used in a separating operation) is driven at the conveying speed V2max to convey the preceding print medium P.

In S504, the driving of the conveyance roller 10 is suppressed or stopped during the wait time Tw calculated in S702 at the timing when the most downstream position of the nozzle 71 is located in the region common to the regions Rw and Rh specified in S705 (see FIG. 9B). This will separate the preceding print medium P from the succeeding print medium P at conveying speed V2=V2max, thereby reducing the overlap amount W and increasing the distance Dp' (<Dp).

In S505, it is determined whether the distance Dp' between the trailing end of the preceding print medium P and the leading end of the succeeding print medium P has reached the distance Dp (Dp'≥Dp). If Dp'≥Dp (YES in the determination or, for example, the state in FIG. 9C), flowchart S50 is terminated, and the process advances to S318 in FIG. 11B; otherwise (NO in the determination), the process returns to S505.

In S506 (if Fw≠1/a wait operation is not executed, NO is determined in S501), the conveying speed V2 (≤V2max) of the preceding print medium P is calculated as $$V2 = L/T\text{max}$$

In S507, it is determined whether the trailing end of the preceding print medium P has passed through the conveyance roller 10 (the upstream roller used in a separating operation). If the trailing end of the preceding print medium P has passed through the conveyance roller 10 (YES in the determination), the process advances to S508; otherwise (NO in the determination), the process returns to S507.

In S508, the conveyance roller 20 (the downstream roller used in a separating operation) is driven at the conveying speed V2 (≤V2max) to convey the preceding print medium P. Thereafter, the process advances to S505.

Example of Planned Printing Area

Although the above embodiment has exemplified the to-be-printed region Ky2 shown in FIG. 9A, it is possible to specify the regions Rw and Rh by another example following a similar procedure. FIGS. 6A to 16D show another example of the to-be-printed region Ky2 on the succeeding print medium P21. Assume that it is determined in S703 that wait time Tw>0 (a wait operation is required).

Figure 16A:
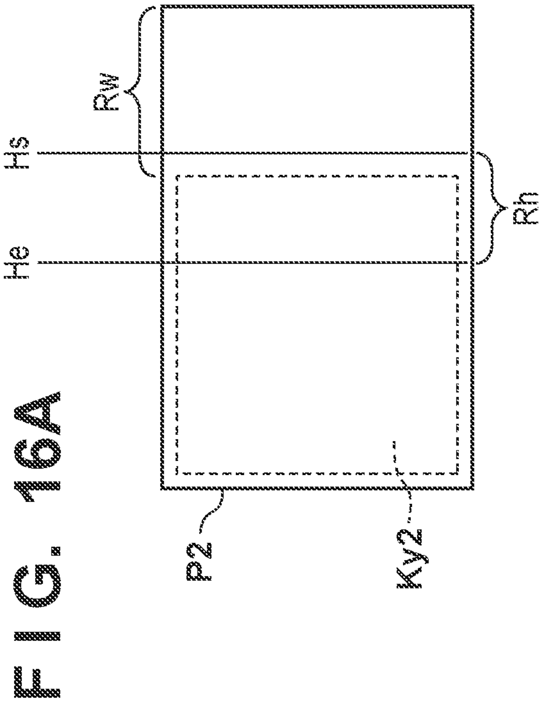
FIGS. 16A to 16D are schematic views showing another example of a planned printing area.

In the example in FIG. 16A, the region between the to-be-printed region Ky2 and an end of the print medium P2 is the wait enable region Rw, and its part is common to the separation region Rh. In such a case, a wait operation can be properly executed in the region common to the regions Rw and Rh.

Figure 16B:
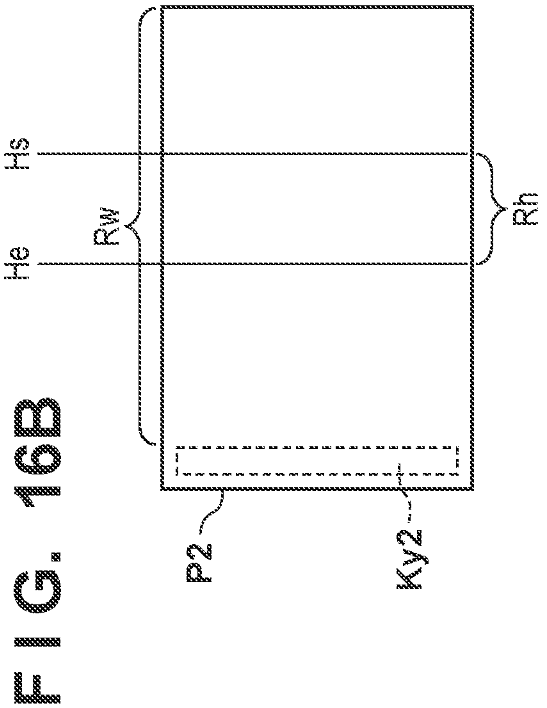

The example in FIG. 16B differs from the example in FIG. 16A in that the separation region Rh is included in the wait enable region Rw. In such a case as well, a wait operation can be properly executed in the region common to the regions Rw and Rh.

Figure 16C:
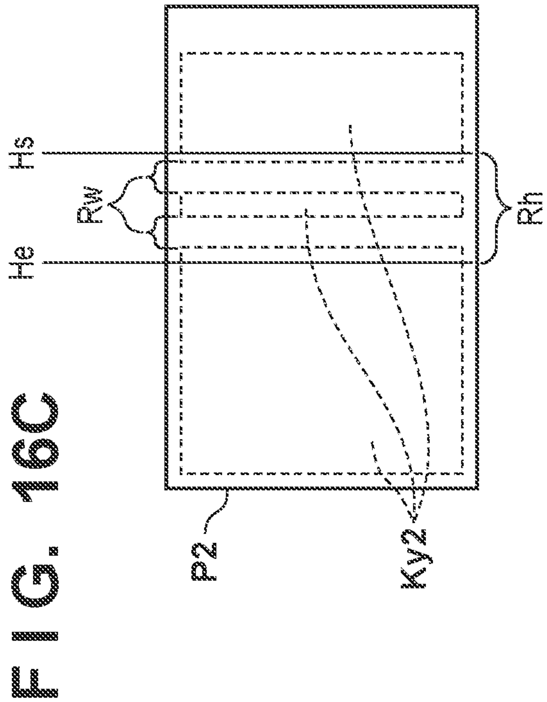

In the example in FIG. 16C, there are two wait enable regions Rw, which are included in the separation region Rh. In such a case as well, a wait operation can be properly executed in the region common to the regions Rw and Rh. That is, even if there are a plurality of wait enable regions Rw, a wait operation can be properly executed in the region common to the regions Rw and Rh.

In the above example, it is determined in S705 that there is a region common to the wait enable region Rw and the separation region Rh, wait execution flag Fw=1 in S706, and a wait operation is executed in the separating operation in S50.

Figure 16D:
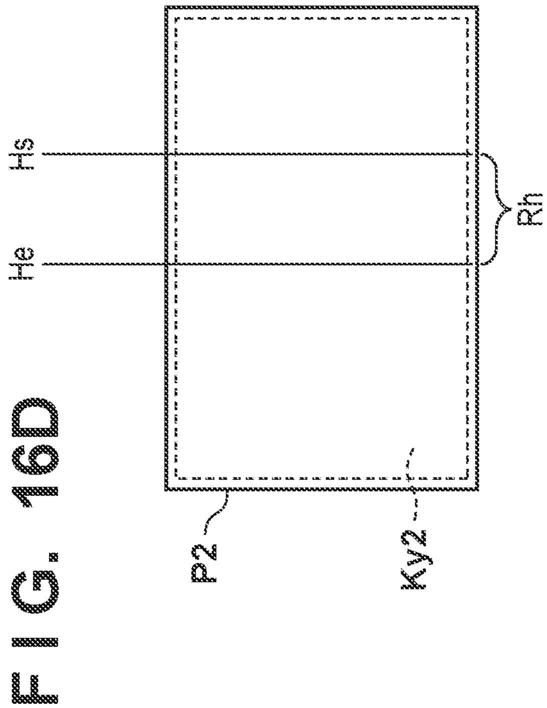

In the example in FIG. 16D, almost the entire region of the print medium P2 is the to-be-printed region Ky2, and there is no wait enable region Rw. In such a case, it is determined in S705 that there is no region common to the regions Rw and Rh, exception processing flag Fr=1 in S707. Accordingly, exception processing is executed in the overlap preparation operation in S40, and the above successive overlapped conveyance is not executed.

As described above, according to this embodiment, when a separating operation is performed to separate the preceding print medium P from the succeeding print medium P and cancel the overlap state, a wait operation is executed in the wait enable region Rw that is not the to-be-printed region Ky2 in a state before a printing operation. This substantially prevents the occurrence of a time difference until ink is dried between a given scanning operation and the next scanning operation by the printhead 7 in the same to-be-printed region Ky2. According to this embodiment, therefore, a wait operation during the execution of a separating operation is executed at the timing when the influence on the print quality is suppressed or reduced.

Note that in this embodiment, the conveyance of the succeeding print medium P is interrupted, and a scanning operation is also interrupted accordingly. However, another approximate operation may be performed as long as the succeeding print medium P is separated from the preceding print medium P.

For example, the conveying speed of the succeeding print medium P may be suppressed/reduced. In this case, the scanning operation interval of the printhead 7 with respect to the succeeding print medium P increases, and hence the print quality can be said to vary as in this embodiment. Therefore, the contents of the embodiment can also be applied to such a case.

<Program>

The present invention may be implemented by supplying a program for implementing one or more functions of the above-described embodiments to a system or apparatus via a network or storage medium and causing one or more processors in the computer of the system or apparatus to read out and execute the program. For example, the present invention may be implemented by a circuit (for example, an ASIC) which implements one or more functions.

Others

In the above description, the printing apparatus 9 using the inkjet printing method has been described as an example. However, the printing method is not limited to this. Furthermore, the printing apparatus 9 may be a single function printer having only a printing function or may be a multi-function printer having a plurality of functions such as a printing function, a FAX function, and a scanner function. In addition, the printing apparatus 9 may be a manufacturing apparatus configured to manufacture, for example, a color filter, an electronic device, an optical device, a microstructure, or the like by a predetermined printing method.

Furthermore, "print" in this specification should be interpreted in a broader sense. Hence, the mode of "print" is irrespective of whether or not the target to be formed on a print medium is significant information such as a character or graphic pattern, and is also irrespective of whether the target is manifested in a way that can be perceived visually by humans.

"Print medium" should also be interpreted in a broader sense, like "print". Hence, the concept of "print medium" can include not only paper used in general but also any materials capable of receiving ink, including fabrics, plastic films, metals, metal plates, glass, ceramics, resins, wood, and leathers.

"Ink" should also be interpreted in a broader sense, like "print". Hence, the concept of "ink" can include not only a liquid that is applied to a print medium to form an image, a design, a pattern, or the like but also an incidental liquid that can be provided to process a print medium or process ink (for example, coagulate or insolubilize color materials in ink applied to a print medium).

In the above aspect, printing may be expressed as liquid discharging. Likewise, the printing apparatus 9 can also be expressed as the liquid discharging apparatus 9. In addition, the printhead 7 can also be expressed as the liquid discharging head 7. Furthermore, the print medium P may be reworded as a liquid discharging target, a medium, or the like.

In the embodiments, individual elements are named by expressions based on their main functions. However, the functions described in the embodiments may be sub-functions, and the expressions are not strictly limited. Furthermore, the expressions can be replaced with similar expressions. In the same vein, an expression "unit (portion)" can be replaced with an expression "tool", "component", "member", "structure", "assembly", or the like. Alternatively, these may be omitted or added.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-068019, filed on Apr. 18, 2023, which is hereby incorporated by reference herein in its entirety.

What is claimed is:

1. A printing apparatus comprising:

a printing unit configured to perform printing on a print medium;

a first conveying roller, which is provided on an upstream side of the printing unit, configured to convey the print medium in a conveying direction;

a second conveying roller configured to convey the print medium conveyed by the first conveying roller;

a third conveying roller configured to convey the print medium to the first conveying roller; and a control unit configured to execute first control to control the first conveying roller and the third conveying roller so as to make a leading end portion of a second print medium succeeding a first print medium overlap a trailing end portion of the first print medium, wherein in a case where a region on the second print medium on which printing is performed by the printing unit is a to-be-printed region, the control unit executes second control to control the first conveying roller and the second conveying roller so as to separate the first print medium and the second print medium made to overlap each other by the first control, and in the second control, conveyance of the second print medium is suppressed while the printing unit is located in a region other than the to-be-printed region.

2. The apparatus according to claim 1, wherein the control unit performs the first control so as to drive the third conveying roller faster than the first conveying roller to convey the second print medium.

3. The apparatus according to claim 1, wherein the control unit performs the second control in response to passage of a trailing end of the first print medium through the first conveying roller.

4. The apparatus according to claim 3, wherein in the second control, a region where the second print medium passes through the first conveying roller in an interval between an instant when the trailing end of the first print medium passes through the first conveying roller and an instant when the trailing end passes through the second conveying roller is a separation region, and the control unit suppresses conveyance of the second print medium while the printing unit is further located in the separation region in the second control.

5. The apparatus according to claim 4, wherein the control unit calculates a time for suppression by the second control based on the separation region, contents of printing on the second print medium by the printing unit, an overlap amount between the first print medium and the second print medium after the first control, a conveying speed for the first print medium, and a conveying speed for the second print medium.

6. The apparatus according to claim 1, wherein the control unit determines whether to perform the first control based on contents of printing on the second print medium by the printing unit, an overlap amount between the first print medium and the second print medium after the first control, a conveying speed for the first print medium, and a conveying speed for the second print medium.

7. The apparatus according to claim 1, wherein the control unit adjusts an overlap amount between the first print medium and the second print medium which is formed by the first control based on contents of printing on the second print medium by the printing unit, a conveying speed for the first print medium, and a conveying speed for the second print medium.

8. The apparatus according to claim 1, wherein the first conveying roller and the second conveying roller are arranged downstream of the printing unit in the conveying direction.

9. The apparatus according to claim 1, wherein the first conveying roller is arranged upstream of the printing unit in the conveying direction, and the second conveying roller is arranged downstream of the printing unit in the conveying direction.

10. A control method for a printing apparatus including a printing unit configured to perform printing on a print medium, a first conveying roller, which is provided on an upstream side of the printing unit, configured to convey a print medium in a conveying direction, a second conveying roller configured to convey a print medium conveyed by the first conveying roller, and a third conveying roller configured to convey the print medium to the first conveying roller, the method comprising:

controlling the first conveying roller and the third conveying roller so as to make a leading end portion of a second print medium succeeding a first print medium overlap a trailing end portion of the first print medium; and controlling the first conveying roller and the second conveying roller so as to separate from each other the first print medium and the second print medium overlapping each other in the controlling the first conveying roller and the second conveying roller so as to make the leading end portion of the second print medium succeeding the first print medium overlap the trailing end portion of the first print medium, wherein when a region on the second print medium on which printing is performed by the printing unit is a to-be-printed region, conveyance of the second print medium is suppressed while the printing unit is located in a region other than the to-be-printed region in the controlling the first conveying roller and the second conveying roller so as to separate from each other the first print medium and the second print medium overlapping each other.

11. A computer-readable non-transitory storage medium storing a program for causing a computer to execute each step in a control method defined in claim 10.

* * * * *